(12) United States Patent
Catten

(10) Patent No.: US 8,688,180 B2
(45) Date of Patent: Apr. 1, 2014

(54) SYSTEM AND METHOD FOR DETECTING USE OF A WIRELESS DEVICE WHILE DRIVING

(75) Inventor: Jonathan C. Catten, Salt Lake City, UT (US)

(73) Assignee: Inthinc Technology Solutions, Inc., West Valley City, UT (US)

( * ) Notice: Subject to any disclaimer, the term of this patent is extended or adjusted under 35 U.S.C. 154(b) by 486 days.

(21) Appl. No.: 12/222,260

(22) Filed: Aug. 6, 2008

(65) Prior Publication Data

US 2010/0035632 A1    Feb. 11, 2010

(51) Int. Cl.
*H04M 1/00*    (2006.01)

(52) U.S. Cl.
USPC .... 455/575.9; 455/420; 455/41.2; 455/550.1; 455/456.1; 455/456.4; 455/575.7

(58) Field of Classification Search
USPC .............. 455/418–420, 405, 345, 67.11, 455/456.3–456.4, 41.1, 41.2, 456.1, 457, 455/550.1, 556.2, 575.7, 575.9
See application file for complete search history.

(56) References Cited

U.S. PATENT DOCUMENTS

| | | |
|---|---|---|
| 3,975,708 A | 8/1976 | Lusk |
| 4,369,427 A | 1/1983 | Drebinger et al. |
| 4,395,624 A | 7/1983 | Wartski |
| 4,419,654 A | 12/1983 | Funk |
| 4,458,535 A | 7/1984 | Juergens |
| 4,785,280 A | 11/1988 | Fubini |
| 4,843,578 A | 6/1989 | Wade |
| 4,926,417 A | 5/1990 | Futami |
| 4,939,652 A | 7/1990 | Steiner |
| 5,032,821 A | 7/1991 | Domanico |
| 5,074,144 A | 12/1991 | Krofchalk et al. |
| 5,119,504 A | 6/1992 | Durboraw, III |
| 5,223,844 A | 6/1993 | Mansell et al. |
| 5,225,842 A | 7/1993 | Brown et al. |
| 5,266,922 A | 11/1993 | Smith et al. |
| 5,303,163 A | 4/1994 | Ebaugh et al. ............... 364/550 |
| 5,305,214 A | 4/1994 | Komatsu |
| 5,309,139 A | 5/1994 | Austin |
| 5,311,197 A | 5/1994 | Sorden et al. |

(Continued)

FOREIGN PATENT DOCUMENTS

| | | |
|---|---|---|
| CA | 2071931 | 12/1993 |
| DE | 197 00 353 A1 | 7/1998 |

(Continued)

OTHER PUBLICATIONS

International Search Report, Sep. 30, 2009, WIPO.

(Continued)

*Primary Examiner* — Vladimir Magloire
*Assistant Examiner* — Babar Sarwar
(74) *Attorney, Agent, or Firm* — Workman Nydegger

(57) ABSTRACT

A system for detecting the use of wireless devices such as a mobile phone, personal digital assistant (PDA), or pagers in a moving vehicle receives wireless signals inside a vehicle using a radio frequency (RF) sensor(s) and converts the RF signals into voltage signals. The voltage signals are then compared with known waveforms to determine if the wireless signals indicate a received call, if the received call is answered, a transmitted call, an SMS text message, data associated with internet browsing on a wireless device, or Bluetooth activity.

30 Claims, 18 Drawing Sheets

(56) References Cited

U.S. PATENT DOCUMENTS

| | | |
|---|---|---|
| 5,325,082 A | 6/1994 | Rodriguez |
| 5,347,260 A | 9/1994 | Ginzel |
| 5,359,528 A | 10/1994 | Haendel |
| 5,365,114 A | 11/1994 | Tsurushima |
| 5,365,451 A | 11/1994 | Wang et al. |
| 5,394,136 A | 2/1995 | Lammers |
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,546,305 A | 8/1996 | Kondo |
| 5,548,273 A | 8/1996 | Nicol |
| 5,581,464 A | 12/1996 | Woll |
| 5,586,130 A | 12/1996 | Doyle ............................ 371/62 |
| 5,600,558 A | 2/1997 | Mearek |
| 5,612,875 A | 3/1997 | Haendel |
| 5,625,337 A | 4/1997 | Medawar |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins |
| 5,801,948 A | 9/1998 | Wood |
| 5,815,071 A | 9/1998 | Doyle |
| 5,825,283 A | 10/1998 | Camhi |
| 5,825,284 A | 10/1998 | Dunwoody |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,941,915 A | 8/1999 | Federle et al. ............... 701/1 |
| 5,945,919 A | 8/1999 | Trask |
| 5,949,330 A | 9/1999 | Hoffman |
| 5,949,331 A | 9/1999 | Schofield |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,064,886 A * | 5/2000 | Perez et al. .................. 455/443 |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,121,922 A | 9/2000 | Mohan |
| 6,130,608 A | 10/2000 | McKeown |
| 6,131,067 A | 10/2000 | Girerd et al. |
| 6,133,827 A | 10/2000 | Alvey |
| 6,141,610 A | 10/2000 | Rothert |
| 6,147,598 A | 11/2000 | Murphy |
| 6,172,602 B1 | 1/2001 | Hasfjord |
| 6,178,374 B1 | 1/2001 | Mohlenkamp et al. ....... 701/117 |
| 6,184,784 B1 | 2/2001 | Shibuya |
| 6,185,501 B1 | 2/2001 | Smith |
| 6,188,315 B1 | 2/2001 | Herbert et al. |
| 6,195,015 B1 | 2/2001 | Jacobs et al. |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,222,458 B1 | 4/2001 | Harris |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,247,360 B1 | 6/2001 | Anderson |
| 6,249,219 B1 | 6/2001 | Perez |
| 6,253,129 B1 | 6/2001 | Jenkins et al. ................. 701/29 |
| 6,255,892 B1 | 7/2001 | Gartner |
| 6,255,939 B1 | 7/2001 | Roth |
| 6,256,558 B1 | 7/2001 | Sugiura et al. |
| 6,262,658 B1 | 7/2001 | O'Connor |
| 6,265,989 B1 | 7/2001 | Taylor |
| 6,266,588 B1 | 7/2001 | McClellan |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,297,768 B1 | 10/2001 | Allen, Jr. |
| 6,301,533 B1 | 10/2001 | Markow |
| 6,306,063 B1 | 10/2001 | Horgan et al. ................ 477/108 |
| 6,308,120 B1 | 10/2001 | Good |
| 6,308,134 B1 | 10/2001 | Croyle et al. |
| 6,313,742 B1 | 11/2001 | Larson |
| 6,320,497 B1 | 11/2001 | Fukumoto |
| 6,331,825 B1 | 12/2001 | Ladner et al. |
| 6,333,686 B1 | 12/2001 | Waltzer |
| 6,337,653 B1 | 1/2002 | Buchler |

(56) References Cited

U.S. PATENT DOCUMENTS

| | | | |
|---|---|---|---|
| 6,339,739 B1 | 1/2002 | Folke | |
| 6,339,745 B1 | 1/2002 | Novik | 701/208 |
| 6,344,805 B1 | 2/2002 | Yasui | |
| 6,351,211 B1 | 2/2002 | Bussard | |
| 6,353,778 B1 | 3/2002 | Brown | |
| 6,356,188 B1 | 3/2002 | Meyers | |
| 6,356,822 B1 | 3/2002 | Diaz | |
| 6,356,833 B2 | 3/2002 | Jeon | |
| 6,356,836 B1 | 3/2002 | Adolph | 701/208 |
| 6,359,554 B1 | 3/2002 | Skibinski | |
| 6,362,730 B2 | 3/2002 | Razavi | |
| 6,362,734 B1 | 3/2002 | McQuade | |
| 6,366,199 B1 | 4/2002 | Osborn | |
| 6,378,959 B2 | 4/2002 | Lesesky | |
| 6,389,340 B1 | 5/2002 | Rayner | |
| 6,393,348 B1 | 5/2002 | Ziegler | |
| 6,404,329 B1 | 6/2002 | Hsu | |
| 6,405,112 B1 | 6/2002 | Rayner | |
| 6,405,128 B1 | 6/2002 | Bechtolsheim et al. | 701/208 |
| 6,415,226 B1 | 7/2002 | Kozak | 701/210 |
| 6,424,268 B1 | 7/2002 | Isonaga | |
| 6,427,687 B1 | 8/2002 | Kirk | |
| 6,430,488 B1 | 8/2002 | Goldman | |
| 6,433,681 B1 | 8/2002 | Foo | |
| 6,441,732 B1 | 8/2002 | Laitsaari | |
| 6,449,540 B1 | 9/2002 | Rayner | |
| 6,459,367 B1 | 10/2002 | Green | |
| 6,459,369 B1 | 10/2002 | Wang | |
| 6,459,961 B1 | 10/2002 | Obradovich | |
| 6,459,969 B1 | 10/2002 | Bates | |
| 6,462,675 B1 | 10/2002 | Humphrey | |
| 6,472,979 B2 | 10/2002 | Schofield | |
| 6,476,763 B2 | 11/2002 | Allen, Jr. | |
| 6,480,106 B1 | 11/2002 | Crombez | |
| 6,484,035 B2 | 11/2002 | Allen, Jr. | |
| 6,484,091 B2 | 11/2002 | Shibata | |
| 6,493,650 B1 | 12/2002 | Rodgers | |
| 6,512,969 B1 | 1/2003 | Wang | |
| 6,515,596 B2 | 2/2003 | Awada | |
| 6,519,512 B1 | 2/2003 | Haas | |
| 6,525,672 B2 | 2/2003 | Chainer | |
| 6,526,341 B1 | 2/2003 | Bird et al. | |
| 6,529,159 B1 | 3/2003 | Fan et al. | |
| 6,535,116 B1 | 3/2003 | Zhou | |
| 6,542,074 B1 | 4/2003 | Tharman | |
| 6,542,794 B2 | 4/2003 | Obradovich | |
| 6,549,834 B2 | 4/2003 | McClellan | |
| 6,552,682 B1 | 4/2003 | Fan | |
| 6,556,905 B1 | 4/2003 | Mittelsteadt | |
| 6,559,769 B2 | 5/2003 | Anthony | |
| 6,564,126 B1 | 5/2003 | Lin | |
| 6,567,000 B2 | 5/2003 | Slifkin | |
| 6,571,168 B1 | 5/2003 | Murphy | |
| 6,577,946 B2 | 6/2003 | Myr | |
| 6,587,759 B2 | 7/2003 | Obradovich | |
| 6,594,579 B1 | 7/2003 | Lowrey | |
| 6,599,243 B2 | 7/2003 | Woltermann | |
| 6,600,985 B2 | 7/2003 | Weaver | |
| 6,604,033 B1 | 8/2003 | Banet | |
| 6,609,063 B1 | 8/2003 | Bender et al. | 701/209 |
| 6,609,064 B1 | 8/2003 | Dean | 701/213 |
| 6,611,740 B2 | 8/2003 | Lowrey | |
| 6,611,755 B1 | 8/2003 | Coffee | |
| 6,622,085 B1 | 9/2003 | Amita et al. | 701/208 |
| 6,629,029 B1 | 9/2003 | Giles | |
| 6,630,884 B1 | 10/2003 | Shanmugham | |
| 6,631,322 B1 | 10/2003 | Arthur et al. | 701/211 |
| 6,636,790 B1 | 10/2003 | Lightner | |
| 6,639,512 B1 | 10/2003 | Lee | |
| 6,643,578 B2 | 11/2003 | Levine | |
| 6,651,001 B2 | 11/2003 | Apsell | |
| 6,654,682 B2 | 11/2003 | Kane et al. | |
| 6,657,540 B2 | 12/2003 | Knapp | |
| 6,662,013 B2 | 12/2003 | Takiguchi et al. | |
| 6,662,141 B2 | 12/2003 | Kaub | 702/181 |
| 6,664,922 B1 | 12/2003 | Fan | |
| 6,665,613 B2 | 12/2003 | Duvall | |
| 6,674,362 B2 | 1/2004 | Yoshioka | |
| 6,675,085 B2 | 1/2004 | Straub | |
| 6,677,854 B2 | 1/2004 | Dix | |
| 6,678,612 B1 | 1/2004 | Khawam | |
| 6,696,932 B2 | 2/2004 | Skibinski | |
| 6,701,234 B1 | 3/2004 | Vogelsang | |
| 6,703,925 B2 | 3/2004 | Steffel | |
| 6,714,894 B1 | 3/2004 | Tobey et al. | 702/188 |
| 6,718,235 B1 | 4/2004 | Borugian | |
| 6,718,239 B2 | 4/2004 | Rayner | |
| 6,727,809 B1 | 4/2004 | Smith | |
| 6,728,542 B2 | 4/2004 | Meda | |
| 6,728,605 B2 | 4/2004 | Lash | |
| 6,732,031 B1 | 5/2004 | Lightner | |
| 6,732,032 B1 | 5/2004 | Banet | |
| 6,737,962 B2 | 5/2004 | Mayor | |
| 6,741,169 B2 | 5/2004 | Magiawala | |
| 6,741,170 B2 | 5/2004 | Alrabady | |
| 6,745,153 B2 | 6/2004 | White | |
| 6,748,322 B1 | 6/2004 | Fernandez | |
| 6,750,761 B1 | 6/2004 | Newman | |
| 6,750,762 B1 | 6/2004 | Porter | |
| 6,756,916 B2 | 6/2004 | Yanai | |
| 6,759,952 B2 | 7/2004 | Dunbridge | |
| 6,766,244 B2 | 7/2004 | Obata et al. | 701/207 |
| 6,768,448 B2 | 7/2004 | Farmer | |
| 6,775,602 B2 | 8/2004 | Gordon | |
| 6,778,068 B2 | 8/2004 | Wolfe | |
| 6,778,885 B2 | 8/2004 | Agashe et al. | |
| 6,784,793 B2 | 8/2004 | Gagnon | |
| 6,784,832 B2 | 8/2004 | Knockeart et al. | |
| 6,788,196 B2 | 9/2004 | Ueda | |
| 6,788,207 B2 | 9/2004 | Wilkerson | |
| 6,792,339 B2 | 9/2004 | Basson | |
| 6,795,017 B1 | 9/2004 | Puranik et al. | |
| 6,798,354 B2 | 9/2004 | Schuessler | |
| 6,803,854 B1 | 10/2004 | Adams et al. | |
| 6,807,481 B1 | 10/2004 | Gastelum | |
| 6,810,321 B1 | 10/2004 | Cook | |
| 6,813,549 B2 | 11/2004 | Good | |
| 6,819,236 B2 | 11/2004 | Kawai | |
| 6,822,557 B1 | 11/2004 | Weber | |
| 6,832,141 B2 | 12/2004 | Skeen | |
| 6,845,314 B2 | 1/2005 | Fosseen | |
| 6,845,316 B2 | 1/2005 | Yates | 701/117 |
| 6,845,317 B2 | 1/2005 | Craine | |
| 6,847,871 B2 | 1/2005 | Malik et al. | 701/33 |
| 6,847,872 B2 | 1/2005 | Bodin | |
| 6,847,873 B1 | 1/2005 | Li | |
| 6,847,887 B1 | 1/2005 | Casino | 701/208 |
| 6,850,841 B1 | 2/2005 | Casino | 701/208 |
| 6,859,039 B2 | 2/2005 | Horie | |
| 6,859,695 B2 | 2/2005 | Klausner | |
| 6,865,457 B1 | 3/2005 | Mittelsteadt | |
| 6,867,733 B2 | 3/2005 | Sandhu et al. | |
| 6,868,386 B1 | 3/2005 | Henderson | |
| 6,870,469 B2 | 3/2005 | Ueda | |
| 6,873,253 B2 | 3/2005 | Veziris | |
| 6,873,261 B2 | 3/2005 | Anthony | |
| 6,879,894 B1 | 4/2005 | Lightner | |
| 6,885,293 B2 | 4/2005 | Okumura | |
| 6,892,131 B2 | 5/2005 | Coffee | |
| 6,894,606 B2 | 5/2005 | Forbes et al. | 340/435 |
| 6,895,332 B2 | 5/2005 | King | |
| 6,909,398 B2 | 6/2005 | Knockeart et al. | |
| 6,909,947 B2 | 6/2005 | Douros et al. | |
| 6,914,523 B2 | 7/2005 | Munch | |
| 6,922,133 B2 | 7/2005 | Wolfe | |
| 6,922,571 B1 | 7/2005 | Kinoshita | |
| 6,922,616 B2 | 7/2005 | Obradovich | |
| 6,922,622 B2 | 7/2005 | Dulin | |
| 6,925,425 B2 | 8/2005 | Remboski | |
| 6,928,348 B1 | 8/2005 | Lightner | |
| 6,937,162 B2 | 8/2005 | Tokitsu | |
| 6,950,013 B2 | 9/2005 | Scaman | |
| 6,954,140 B2 | 10/2005 | Holler | |
| 6,958,976 B2 | 10/2005 | Kikkawa | |

(56) References Cited

U.S. PATENT DOCUMENTS

| | | | |
|---|---|---|---|
| 6,965,827 B1 | 11/2005 | Wolfson | 701/207 |
| 6,968,311 B2 | 11/2005 | Knockeart et al. | |
| 6,970,075 B2 | 11/2005 | Cherouny | |
| 6,970,783 B2 | 11/2005 | Knockeart et al. | |
| 6,972,669 B2 | 12/2005 | Saito | |
| 6,980,131 B1 | 12/2005 | Taylor | |
| 6,981,565 B2 | 1/2006 | Gleacher | |
| 6,982,636 B1 | 1/2006 | Bennie | |
| 6,983,200 B2 | 1/2006 | Bodin | |
| 6,988,033 B1 | 1/2006 | Lowrey | |
| 6,988,034 B1 | 1/2006 | Marlatt et al. | 701/200 |
| 6,989,739 B2 | 1/2006 | Li | |
| 7,002,454 B1 | 2/2006 | Gustafson | |
| 7,002,579 B2 | 2/2006 | Olson | |
| 7,005,975 B2 | 2/2006 | Lehner | |
| 7,006,820 B1 | 2/2006 | Parker et al. | |
| 7,019,641 B1 | 3/2006 | Lakshmanan | |
| 7,023,321 B2 | 4/2006 | Brillon et al. | |
| 7,023,332 B2 | 4/2006 | Saito | |
| 7,024,318 B2 | 4/2006 | Fischer | |
| 7,027,808 B2 | 4/2006 | Wesby | |
| 7,034,705 B2 | 4/2006 | Yoshioka | |
| 7,038,578 B2 | 5/2006 | Will | |
| 7,042,347 B2 | 5/2006 | Cherouny | |
| 7,047,114 B1 | 5/2006 | Rogers | |
| 7,049,941 B2 | 5/2006 | Rivera-Cintron | |
| 7,054,742 B2 | 5/2006 | Khavakh et al. | 701/209 |
| 7,059,689 B2 | 6/2006 | Lesesky | |
| 7,065,349 B2 | 6/2006 | Nath et al. | |
| 7,069,126 B2 | 6/2006 | Bernard | |
| 7,069,134 B2 | 6/2006 | Williams | |
| 7,072,753 B2 | 7/2006 | Eberle | |
| 7,081,811 B2 | 7/2006 | Johnston | |
| 7,084,755 B1 | 8/2006 | Nord | |
| 7,088,225 B2 | 8/2006 | Yoshioka | |
| 7,089,116 B2 | 8/2006 | Smith | |
| 7,091,880 B2 | 8/2006 | Sorensen | |
| 7,098,812 B2 | 8/2006 | Hirota | |
| 7,099,750 B2 | 8/2006 | Miyazawa | |
| 7,099,774 B2 | 8/2006 | King | |
| 7,102,496 B1 | 9/2006 | Ernst | |
| 7,109,853 B1 | 9/2006 | Mattson | |
| 7,113,081 B1 | 9/2006 | Reichow | |
| 7,113,107 B2 | 9/2006 | Taylor | |
| 7,117,075 B1 | 10/2006 | Larschan | |
| 7,119,696 B2 | 10/2006 | Borugian | |
| 7,124,027 B1 | 10/2006 | Ernst | |
| 7,124,088 B2 | 10/2006 | Bauer et al. | |
| 7,129,825 B2 | 10/2006 | Weber | |
| 7,132,934 B2 | 11/2006 | Allison | |
| 7,132,937 B2 | 11/2006 | Lu | |
| 7,132,938 B2 | 11/2006 | Suzuki | |
| 7,133,755 B2 | 11/2006 | Salman | |
| 7,135,916 B2 | 11/2006 | Schmidt | |
| 7,135,983 B2 | 11/2006 | Filippov | |
| 7,139,661 B2 | 11/2006 | Holze | |
| 7,145,442 B1 | 12/2006 | Wai | |
| 7,149,206 B2 | 12/2006 | Pruzan | |
| 7,155,259 B2 | 12/2006 | Bauchot et al. | |
| 7,155,321 B2 | 12/2006 | Bromley et al. | 701/29 |
| 7,161,473 B2 | 1/2007 | Hoshal | |
| 7,164,986 B2 | 1/2007 | Humphries | |
| 7,170,390 B2 | 1/2007 | Quiñones | |
| 7,170,400 B2 | 1/2007 | Cowelchuk | |
| 7,174,243 B1 | 2/2007 | Lightner | |
| 7,180,407 B1 | 2/2007 | Guo | |
| 7,180,409 B2 | 2/2007 | Brey | |
| 7,187,271 B2 | 3/2007 | Nagata | |
| 7,196,629 B2 | 3/2007 | Ruoss | |
| 7,197,500 B1 | 3/2007 | Israni et al. | 707/100 |
| 7,216,022 B2 | 5/2007 | Kynast et al. | 701/1 |
| 7,216,035 B2 | 5/2007 | Hörtner | |
| 7,218,211 B2 | 5/2007 | Ho | |
| 7,222,009 B2 | 5/2007 | Hijikata | |
| 7,225,065 B1 | 5/2007 | Hunt | |
| 7,228,211 B1 | 6/2007 | Lowrey | |
| 7,233,235 B2 | 6/2007 | Pavlish | |
| 7,236,862 B2 | 6/2007 | Kanno | |
| 7,239,948 B2 | 7/2007 | Nimmo | |
| 7,256,686 B2 | 8/2007 | Koutsky | |
| 7,256,700 B1 | 8/2007 | Ruocco | |
| 7,256,702 B2 | 8/2007 | Isaacs | |
| 7,260,497 B2 | 8/2007 | Watabe | |
| RE39,845 E | 9/2007 | Hasfjord | |
| 7,269,507 B2 | 9/2007 | Cayford | 701/208 |
| 7,269,530 B1 | 9/2007 | Lin | |
| 7,271,716 B2 | 9/2007 | Nou | |
| 7,273,172 B2 | 9/2007 | Olsen | |
| 7,280,046 B2 | 10/2007 | Berg | |
| 7,283,904 B2 | 10/2007 | Benjamin | |
| 7,286,917 B2 | 10/2007 | Hawkins | |
| 7,286,929 B2 | 10/2007 | Staton | |
| 7,289,024 B2 | 10/2007 | Sumcad | |
| 7,289,035 B2 | 10/2007 | Nathan | |
| 7,292,152 B2 | 11/2007 | Torkkola | |
| 7,292,159 B2 | 11/2007 | Culpepper | |
| 7,298,248 B2 | 11/2007 | Finley | |
| 7,298,249 B2 | 11/2007 | Avery | |
| 7,301,445 B2 | 11/2007 | Moughler | |
| 7,308,247 B2 | 12/2007 | Thompson et al. | |
| 7,317,383 B2 | 1/2008 | Ihara | |
| 7,317,392 B2 | 1/2008 | DuRocher | |
| 7,317,927 B2 | 1/2008 | Staton | |
| 7,319,848 B2 | 1/2008 | Obradovich | |
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |
| 7,349,782 B2 | 3/2008 | Churchill | |
| 7,352,081 B2 | 4/2008 | Taurasi | |
| 7,355,508 B2 | 4/2008 | Mian | |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,474,264 B2 | 1/2009 | Bolduc et al. | |
| 7,474,269 B2 | 1/2009 | Mayer et al. | |
| 7,499,949 B2 | 3/2009 | Barton | 707/104.1 |
| 7,565,230 B2 | 7/2009 | Gardner et al. | 701/35 |
| 7,697,917 B2 | 4/2010 | Camp et al. | |
| 7,876,205 B2 | 1/2011 | Catten | |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 2001/0018628 A1 | 8/2001 | Jenkins et al. | 701/35 |
| 2002/0024444 A1 | 2/2002 | Hiyama et al. | 340/576 |
| 2002/0111725 A1 | 8/2002 | Burge | |
| 2002/0128000 A1 | 9/2002 | do Nascimento | |
| 2003/0013460 A1 * | 1/2003 | Papadias et al. | 455/456 |
| 2003/0055555 A1 | 3/2003 | Knockeart et al. | |
| 2003/0069000 A1 * | 4/2003 | Kindo et al. | 455/345 |
| 2003/0134660 A1 | 7/2003 | Himmel et al. | |
| 2004/0039504 A1 | 2/2004 | Coffee et al. | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0142672 A1 | 7/2004 | Stankewitz | |
| 2004/0176083 A1 | 9/2004 | Shiao et al. | |
| 2004/0210353 A1 | 10/2004 | Rice | 701/1 |
| 2004/0236474 A1 | 11/2004 | Chowdhary et al. | 701/1 |
| 2004/0236475 A1 | 11/2004 | Chowdhary | |
| 2005/0064835 A1 | 3/2005 | Gusler | |
| 2005/0070245 A1 | 3/2005 | Nath et al. | |

(56) References Cited

U.S. PATENT DOCUMENTS

| | | |
|---|---|---|
| 2005/0091018 A1 | 4/2005 | Craft |
| 2005/0096809 A1 | 5/2005 | Skeen et al. |
| 2005/0137757 A1 | 6/2005 | Phelan et al. .................... 701/1 |
| 2005/0184860 A1 | 8/2005 | Taruki et al. |
| 2005/0255874 A1* | 11/2005 | Stewart-Baxter et al. . 455/550.1 |
| 2006/0121951 A1 | 6/2006 | Perdomo et al. |
| 2006/0154687 A1 | 7/2006 | McDowell |
| 2006/0212195 A1 | 9/2006 | Veith et al. |
| 2006/0220905 A1 | 10/2006 | Hovestadt |
| 2006/0234711 A1 | 10/2006 | McArdle |
| 2006/0281495 A1* | 12/2006 | Yang ............................. 455/563 |
| 2006/0284769 A1* | 12/2006 | Bolduc et al. ................. 342/463 |
| 2007/0202929 A1 | 8/2007 | Satake |
| 2007/0229234 A1 | 10/2007 | Smith |
| 2007/0293206 A1 | 12/2007 | Lund |
| 2008/0064413 A1 | 3/2008 | Breed |
| 2008/0064446 A1* | 3/2008 | Camp et al. .................... 455/565 |
| 2008/0255722 A1 | 10/2008 | McClellan et al. |
| 2008/0255888 A1 | 10/2008 | Berkobin |
| 2008/0262670 A1 | 10/2008 | McClellan et al. |
| 2009/0085728 A1 | 4/2009 | Catten |
| 2010/0130182 A1 | 5/2010 | Rosen |
| 2010/0134182 A1 | 6/2010 | Kapoor et al. |
| 2011/0115618 A1 | 5/2011 | Catten |

FOREIGN PATENT DOCUMENTS

| | | |
|---|---|---|
| JP | 2007235530 | 9/2007 |
| WO | WO 2004019646 | 3/2004 |
| WO | WO 2005003885 | 1/2005 |
| WO | WO2005109369 | 11/2005 |
| WO | WO2008109477 | 9/2008 |

OTHER PUBLICATIONS

Ogle, et al.; *Accuracy of Global Positioning System for Determining Driver Performance Parameters*; Transportation Research Record 1818; Paper No. 02-1063; pp. 12-24.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

U.S. Appl. No. 11/755,556, filed Sep. 1, 2009, Office Action.
U.S. Appl. No. 11/866,247, filed Sep. 29, 2009, Office Action.
U.S. Appl. No. 11/755,556, filed May 4, 2010, Office Action.
U.S. Appl. No. 11/866,247, filed Jun. 25, 2010, Notice of Allowance.
U.S. Appl. No. 11/866,247, filed Nov. 29, 2010, Notice of Allowance.
U.S. Appl. No. 13/012,660, filed Feb. 16, 2011, Office Action.
U.S. Appl. No. 13/012,660, filed Nov. 14, 2011, Office Action.
U.S. Appl. No. 13/012,660, filed Apr. 11, 2012, Office Action.
U.S. Appl. No. 13/012,660, filed Aug. 1, 2012, Office Action.
U.S. Appl. No. 13/012,660, filed Nov. 26, 2012, Office Action.
U.S. Appl. No. 13/012,660, filed Mar. 18, 2013, Office Action.
U.S. Appl. No. 13/012,660, filed Jul. 8, 2013, Office Action.

* cited by examiner

SYSTEM AND METHOD FOR DETECTING USE OF A WIRELESS DEVICE WHILE DRIVING

TECHNICAL FIELD

This disclosure relates to a system and method for detecting the use of wireless devices, such as mobile phones, in vehicles.

BACKGROUND

The use of wireless devices, such as cellular telephones or personal digital assistants (PDA), by drivers who talk on the phone or send or read text messages while driving is thought to be a cause of distracted, erratic, and/or aggressive driving, especially among teenage drivers, and is believed to increase the likelihood of accidents. Some cities restrict cellular phone use while driving or require that drivers use hands-free mode on their wireless phone to talk while driving. Other cities are considering restricting the use of text messaging applications while driving.

Additionally, parents desire to monitor their children's driving and cellular phone use, and fleet owners or insurance companies desire to monitor drivers' cellular phone use for liability purposes.

As shown in FIG. 1, using a driving simulator, Ford compared the response of teenage and adult drivers to traffic events happening in front of them. As shown on the left portion of the chart, both groups of drivers missed about 3% of potentially dangerous events under normal simulated driving conditions. When placing a phone call using a handheld device, as shown on the right portion of the chart, the rate of missed events rose to 13.6% for adult drivers and to 53.8% for teenage drivers.

Therefore, there is a need to improve driver behavior and safety with respect to the use of wireless devices in moving vehicles.

SUMMARY

The present invention is directed to a system and method of detecting the use of wireless devices such as a mobile phone, personal digital assistant (PDA), or pager in a moving vehicle. The invention receives wireless signals inside a vehicle using a radio frequency (RF) sensor and converts the RF signals into voltage signals. The voltage signals are then compared with known waveforms to determine if the wireless signals indicate a received call, if the received call is answered, a transmitted call, an SMS text message, data associated with internet browsing on a wireless device, or Bluetooth activity.

In an embodiment of the present invention, the number of passengers in a vehicle is monitored. The number of passengers may be determined by discriminating among multiple wireless signals, or may be determined by using various vehicle sensors, including seat belt sensors, seat weight sensors, airbag sensors, tire pressure sensors, and others.

Further features of the present invention, as well as the structure and operation of various embodiments of the present invention are described in detail below with reference to the accompanying drawings.

BRIEF DESCRIPTION OF THE DRAWINGS

In the drawings, like reference numbers indicate identical or functionally similar elements. Additionally, the left-most digit(s) of a reference number identifies the drawing in which the reference number first appears.

DETAILED DESCRIPTION

Figure 1:
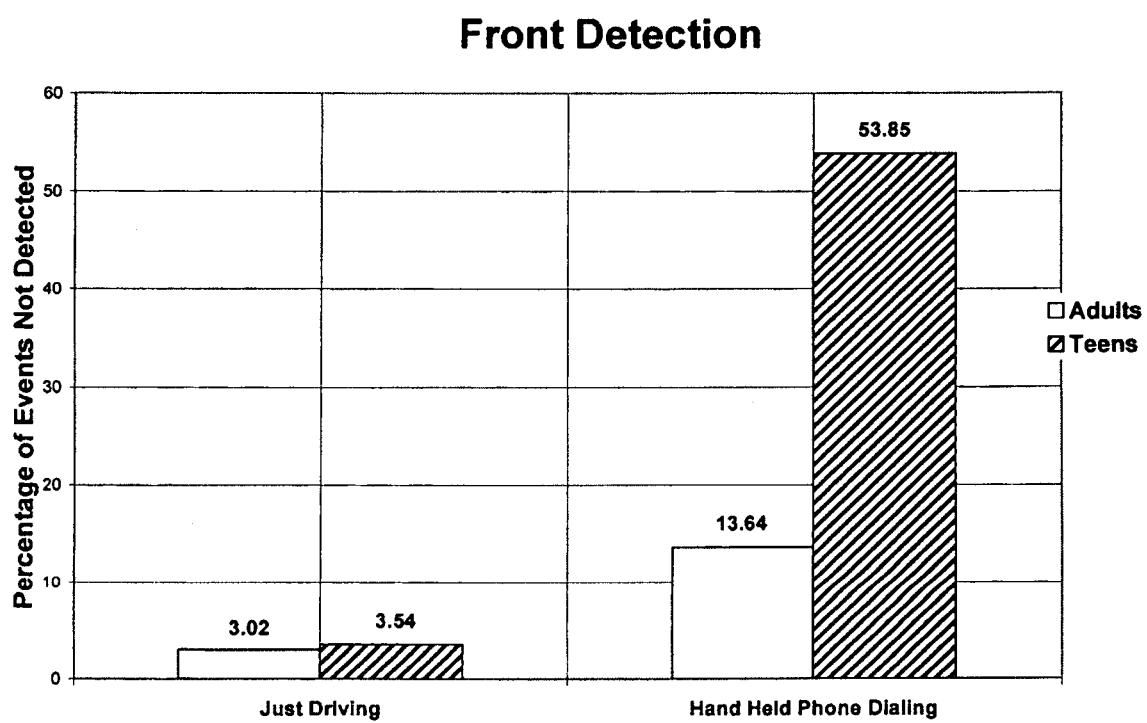
FIG. 1 is a chart comparing the percentage of events not detected among adult and teenage drivers while placing a phone call and under regular driving conditions.

A system for detecting the use of wireless devices in a moving vehicle includes an input for receiving signals indicative of wireless transmissions, a processor for characterizing the received signals, and an output for mobile device use notification. Wireless devices include, for example, mobile phones, wireless messaging devices, personal digital assistants ("PDA"), data communication devices, and the like.

Many different strategies may be employed for the detection of wireless transmissions. For example, in some implementations, an antenna is used to receive wireless signals. When wireless signals are received, they are characterized to determine their nature. For example, a mobile phone periodically broadcasts information even when it is not in use. Accordingly, the system is capable of differentiating various transmissions using signal processing techniques, such as the following: (1) filtering the received signals; (2) detecting identifying characteristics of the received signals; (3) performing a statistical analysis to determine the most likely signal characterization; (4) neural networks; (5) and the like. In this manner, actual use can be differentiated from receipt of text messages, receipt of emails, voicemail notification, cell handoffs and control signaling, etc.

When a single antenna is used, it can be difficult to differentiate transmissions from inside the vehicle and transmissions from mobile devices outside the vehicle. Further, a single antenna may make it difficult to determine whether a mobile device is being used by the driver or a passenger. Accordingly, in some embodiments, multiple sensors are used together with signal processing to determine the location of the transmission source. For example, two or more antennas, microphones, or other sensors can be used to each receive the same transmission. Using known signal processing techniques, the differences between the amplitude and phase of the received signals can be used to calculate the location of the transmission source. In this manner, it is possible to differentiate mobile device use by the driver from mobile device use by a passenger or by someone external to the vehicle.

Once cell phone use is detected, appropriate notifications can be made. The notifications sent by the system can be varied depending on the intended implementation. For example, in a teenage driver safety mentoring system, notifications can be sent to parents whenever cell phone is used in a moving car. Implementations may include one or more of the following: (1) notifying the driver of unsafe mobile device utilization in a moving vehicle; and (2) notifying someone other than the driver (e.g., a parent, insurance company, parole officer, police, and the like) of unsafe mobile device utilization in a moving vehicle.

Various implementations of systems and methods for detecting the use of mobile devices are described herein below. In one implementation, a device receives wireless signals inside a vehicle using a radio frequency (RF) sensor and converts the RF signals into voltage signals. The voltage signals are then compared with known waveforms to determine if the wireless signals indicate a received call, if the received call is answered, a transmitted call, an SMS text message, data associated with internet browsing on a wireless device, or Bluetooth activity.

Determining Mobile Device Usage

Figure 2:
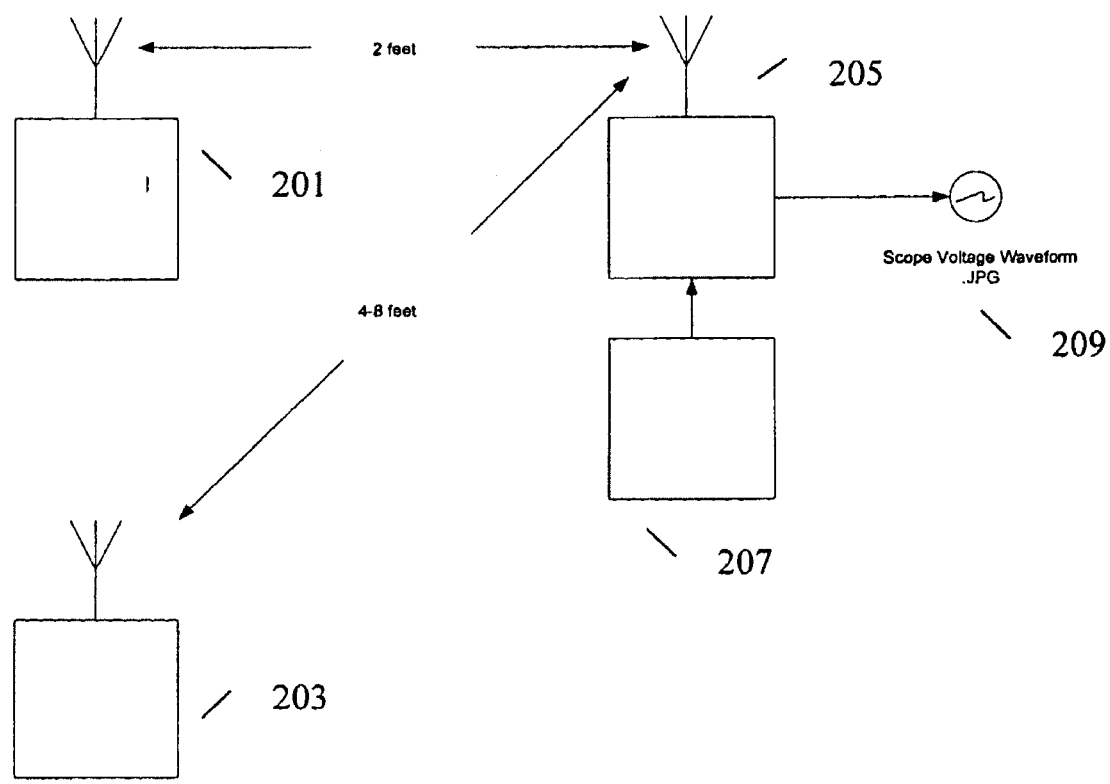
FIG. 2 is a block diagram of an RF sensing device for detecting wireless signals in a moving vehicle.

Referring now to FIG. 2, a device is provided to detect the use of mobile devices in a moving vehicle. A driver's cell phone 201 broadcasts and receives wireless signals. Similarly, another cell phone 203 is located nearby, either with a passenger in the same vehicle or in a nearby vehicle. While driver's cell phone 201 and nearby cell phone 203 are both cell phones, one or both could be another wireless communications device, such as a personal digital assistant (PDA). Alternatively, one or both of cell phones 201 and 203 could be a Bluetooth hands-free device that communicates wirelessly with a master cell phone located near the Bluetooth device. Bluetooth, as is known in the art, is a wireless communications standard used in short-range communications.

Referring again to FIG. 2, a power detector 205 receives wireless signals through its antenna, powered by a power supply 207. The antenna is preferably tuned to the quad-band frequencies used by wireless devices, which are 850, 900, 1800, and 1900 MHz, which includes TDMA, GSM, and CDMA standards, as are known in the art. The power detector 205 outputs a voltage waveform 209. The voltage waveforms are used to determine the use of the mobile phone 201 or 203. Received amplitude levels of the wireless signals are used to determine if the mobile phone is that of the driver or that of another nearby user, such as a passenger or a nearby driver or passenger in a different vehicle.

As shown in FIG. 2, the driver cell phone 201 is located within approximately 2 feet of the power detector 205, while the nearby cell phone 203 is located approximately 4-8 feet from the power detector 205.

Using a simplified version of the free space loss equation, the received power for the two different cell phones, 201 and 203, can be calculated. With isotropic (omni-directional) transmit and receive antennas having 0 dBi gain, distance d=2 feet, transmit frequency f=900 MHz, transmit power=4 watts, transmit distance greater than a wavelength thus prompting far-field equations, the free space loss is given as:

$$\begin{aligned} \text{Free space loss (dB)} &= 36.56 + 20\log(d/5280) + 20\log(f) \\ &= 36.56 + 20\log(2/5280) + 20\log(900) \\ &= 27.2 \text{ dB} \end{aligned}$$

Thus, the received power is calculated as:

$$\begin{aligned} \text{Received antenna power (dB)} &= 20\log(\text{transmit power}) - \text{free space loss} \\ &= 20\log(4) - 27.2 \\ &= -15 \text{ dB} \end{aligned}$$

This decibel level converts to approximately 2V in the log-voltage converter. Doubling the distance to 4 feet results in 6 dB less, or −21 dB, which converts to 1.3V. That is approximately 200 mV per foot of distance from the receiver.

Using an isotropic receive antenna, various other factors affect received power level. Examples of these factors include multi-path effects, the type of radio, the distance from a tower, and phone orientation. More specifically, multi-path effects include reflections off of objects causing standing waves. TDMA (time division multiple access) and CDMA (code division multiple access) cell phones have different transmission power levels. As a cell phone moves away from a cell tower, the cell phone increases transmission power, and vice versa. Also, when a cell phone is held vertically or at an angle, the power transmission level changes, as power radiates mainly away from the head, usually in a cardioid shape. All of these factors combine to make received power levels of a driver's cell phone or of a nearby cell phone difficult to distinguish with an isotropic antenna. With a directional antenna, such as an antenna that attenuates driver side-to-side RF power by at least 10 dBi, many of these conflicting power levels are able to be more easily differentiated. Various power conditions are shown in the table below:

| Effect Description | Typical Variability |
| --- | --- |
| Phone orientation | +/−6 dB or +/−0.25 volts |
| Multi-path effects | +/−6 dB or +/−0.25 volts |
| Distance from a tower | +/−10 dB or +/−0.4 volts |
| TDMA/CDMA radio | +/−6 dB or +/−0.25 volts |
| Driver distance from power detector | +/−5 dB or +/−0.2 volts |

A minimum power threshold prevents the power detector from measuring all received signals. Instead, the power detector only converts wireless signals of nearby cell phones into voltage waveforms. The minimum power threshold can be a moving or learning threshold. Additionally, two or more thresholds can be used to discriminate between outside cell phones, passenger cell phones, and driver cell phones.

Figure 3:
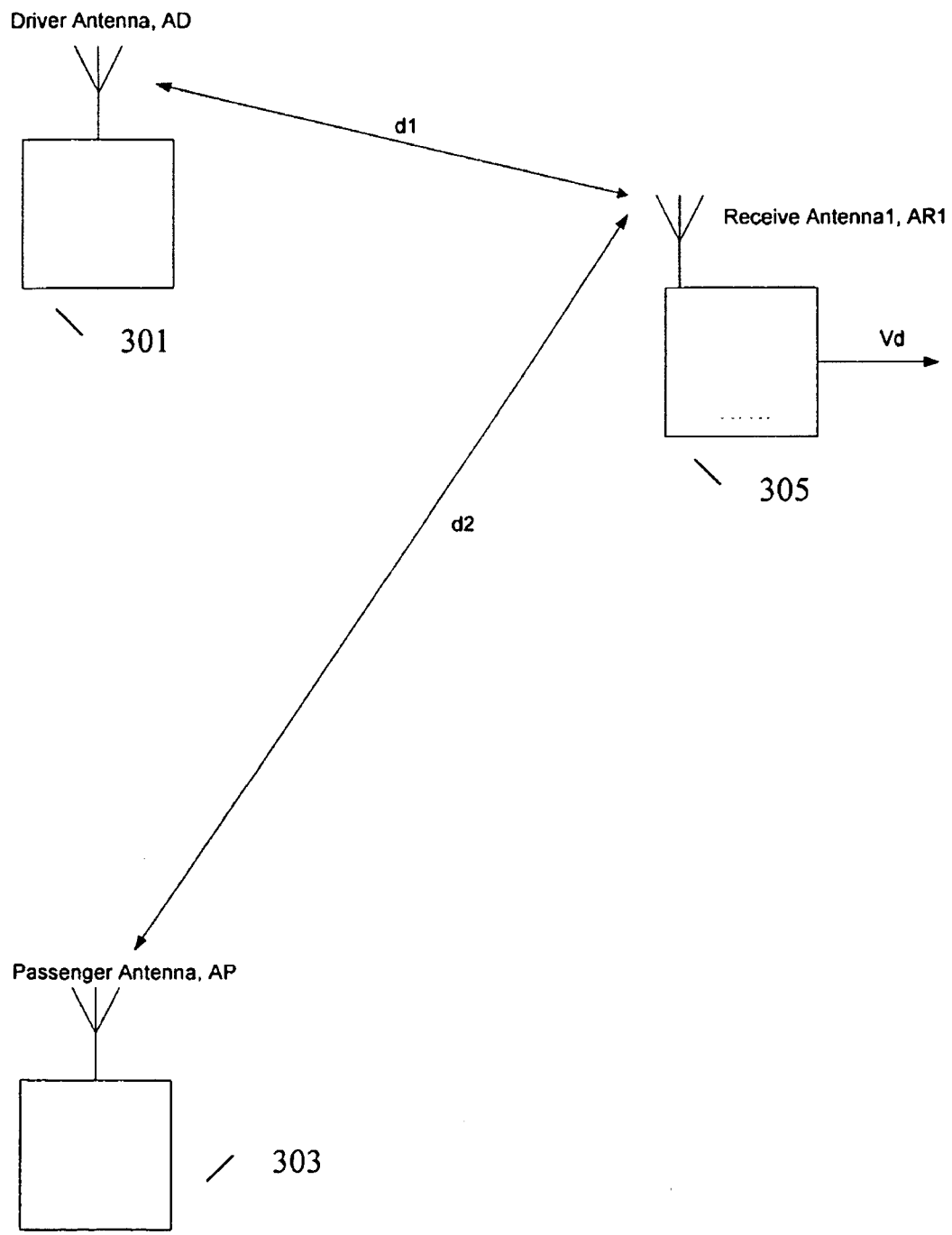
FIG. 3 is a block diagram of a directional RF sensing device for detecting wireless signals in a moving vehicle.

Referring now to FIG. 3, there is shown a directional antenna illustrating in more detail the concepts described above. In FIG. 3, driver cell phone antenna 301 and passenger cell phone antenna 303 are located a distance d1 and d2 from receive antenna 305, respectively. The receive antenna 305 is directional and favors the driver cell phone signal by at least 10 dBi over the passenger cell phone signal. The output voltage Vd is used to differentiate between the driver signal and the passenger signal. Two thresholds, Vdt and Vpt, are calibrated to detect the driver cell phone voltage and passenger cell phone voltage, respectively. For the driver signal, Vd<Vdt, and for the passenger signal, Vd>Vpt. Thus, the directional antenna 305 can be used to determine whether a received signal is from the driver cell phone 301 or the passenger cell phone 303 by comparing Vd to Vdt and Vpt.

Figure 4:
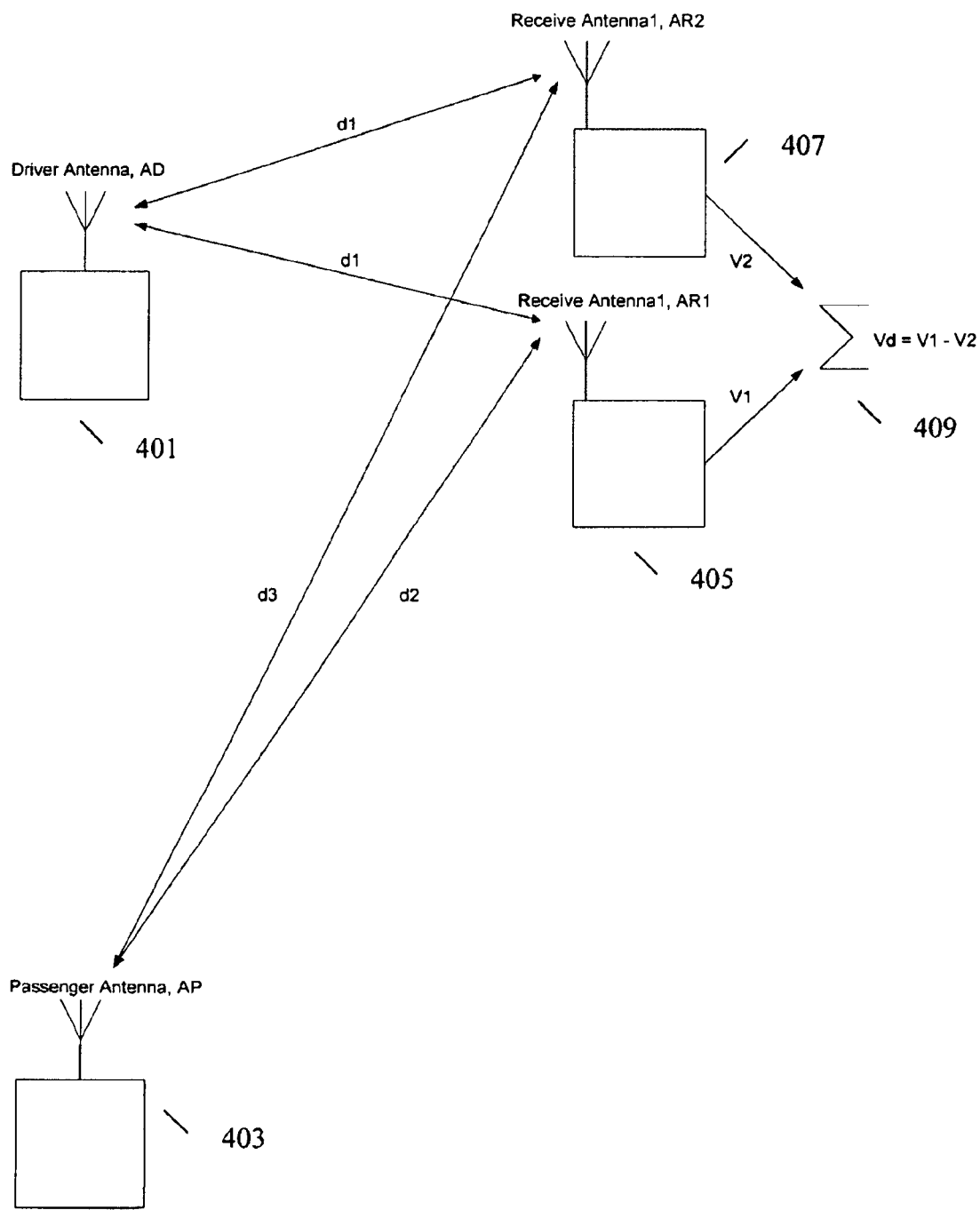
FIG. 4 is a block diagram of multiple RF sensing devices for detecting wireless signals in a moving vehicle.

Referring now to FIG. 4, there is shown an alternate antenna design. The driver antenna 401 and the passenger antenna 403 broadcast and are received by a first antenna 405 and a second antenna 407, which are identical antennas located some distance apart. The spacing between first antenna 405 and second antenna 407 allows the two antennas, in combination, to determine the location of various received signals. The driver antenna 401 is located a distance d1 from the two antennas 405 and 407, while the passenger antenna 403 is located a distance d2 from the two antennas 405 and 407. The distance d1 is approximately the same between the driver antenna 401 and the first antenna 405 and the driver antenna 401 and the second antenna 407, because two antennas 405 and 407 are located near enough to each other that the difference between the driver antenna 401 and the first antenna 405 and the driver antenna 401 and the second antenna 407 is negligible.

The output waveform 409 is the difference between the voltage from the first antenna V1 and the voltage from the second antenna V2. As described above with respect to FIG. 3, the output voltage Vd is used to differentiate between the driver signal and the passenger signal. Two thresholds, Vdt and Vpt, are calibrated to detect the driver cell phone voltage and passenger cell phone voltage, respectively. For the driver signal, Vd<Vdt, and for the passenger signal, Vd>Vpt.

Figure 5:
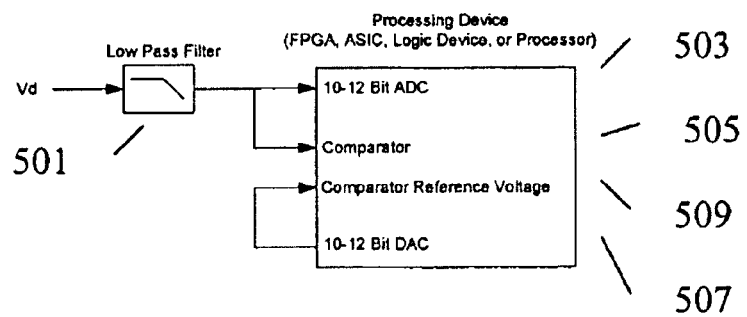
FIG. 5 is a block diagram of a processor configured to detect wireless signals in a moving vehicle.

Referring now to FIG. 5, there is illustrated therein a processor that uses the voltage waveform 209 as shown in FIG. 2 to determine the exact cell phone usage. In FIG. 5, the input voltage Vd is passed through a low pass filter 501 to a 10-12 bit ADC 503 and a comparator 505. By waveform analysis, a voltage trigger level is created by a 10-12 bit DAC 507 and is passed to a comparator trigger level input 509. The processor may be an FPGA, ASIC, or other logic device, as is known in the art.

In more detail, an input voltage Vd, in the form of pulses, is passed through a low pass filter 501, e.g., a $2^{nd}$ order Sallen-Key with fc=5 KHz. The voltage waveform Vd as described above of approximately 4 mV per 0.1 dB, ranges from 0.2V or −60 dB to 2.4V or −5 dB. The waveform Vd is passed into comparator 505, and the transitions crossing the comparator trigger level create interrupts on both positive and negative edge crossings. The time between the positive and negative crossing interrupts is the pulse duration. During each active pulse duration, the ADC 503 measures the average pulse amplitude. The average amplitude is used for differentiation between the driver, passenger, and other nearby cell phone signals. The average amplitude is also used for identification of amplitude variations from phone proximity, orientation, and multi-path.

Using a comparator and state machines with stored memory, a table lookup, digital signal processing, neural network processing, or other method, the processor determines whether the voltage waveform indicates a voice call, a text message, internet browsing, Bluetooth activity, or other wireless activity. The processor also uses state-machine confidence counters to determine confidences about waveform determinations. Confidence counter thresholds, which may be set at any level and may be adaptive, represent a "high likeness" level of detection of a certain type or types of waveform. Confidence counters are weighted toward the "no confidence" or "zero confidence" state. Confidence counter outcomes map, in combination with each other, to waveform identification tables. Additionally, over time, the processor learns the particular cell phone voltage pattern and movement.

Figure 6:
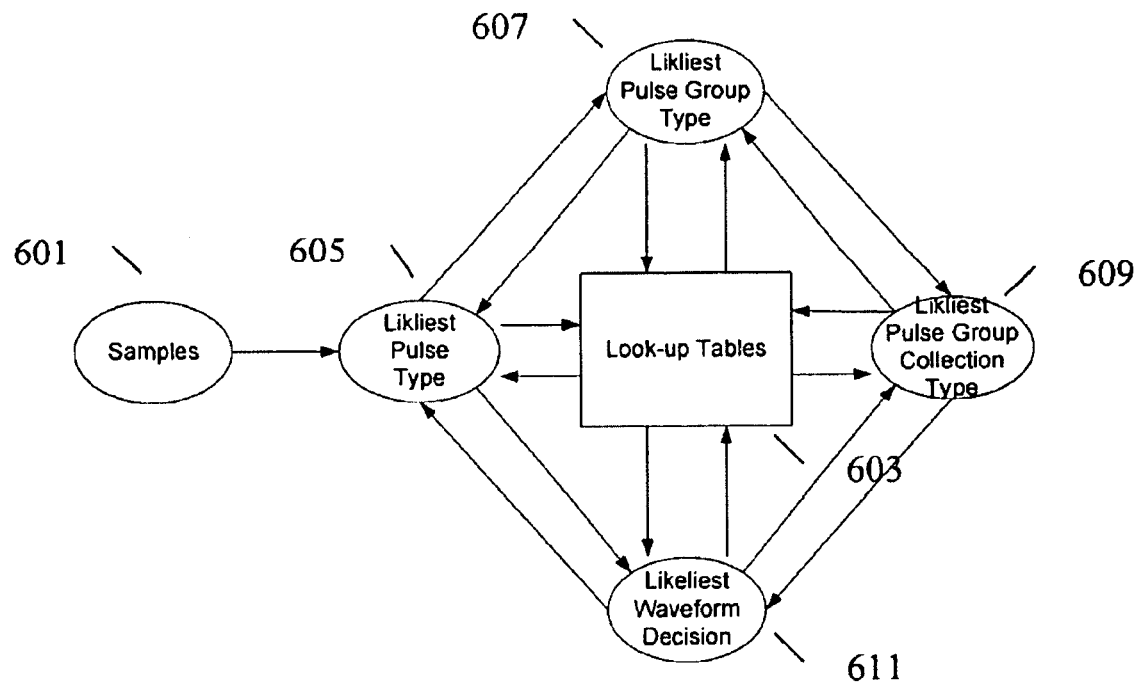
FIG. 6 is a state diagram for the detection of wireless signals in a moving vehicle.

Referring now to FIG. 6, there is illustrated a state flow diagram of a preferred embodiment of the state machine concept described above. The processor of FIG. 5 measures pulse duration and pulse amplitude. The sampled waveform 601 is then compared to look-up tables 603. The likeliest pulse type 605 is determined by the measured pulse width time, inter-pulse times, and by feedback from other processes. The likeliest pulse group type 607 is determined by timing behind groups of likeliest pulse types 605 and by feedback from other processes. The likeliest pulse group collection type 609 is determined by timing behind a collection of pulse group types 607 and by feedback from other processes. The likeliest waveform decision 611 is determined by the likeliest types that were determined by the other processes. All of these processors include comparator trigger level calculations.

The processor can store local data relating to cell phone usage, as well as store a library of known cell phone wireless signals converted to voltage waveforms. Additionally, the processor may communicate with a remote server in order to update a library of known cell phone wireless signals converted to voltage waveforms. The server may also store information relating to measured cell phone usage, backing up the memory of the processor or replacing the memory. In this way, over time, the library of stored voltage waveforms can be adapted or updated.

Power detector 205 of FIG. 2 can include additional sensors or communication interfaces to receive additional data. For example, power detector 205 may include a directional microphone to monitor voice sounds and other sounds, in order to more precisely determine location and user of a mobile phone. Power detector 205 may additionally include a motion sensor, such as a global positioning (GPS) device, accelerometer, or other motion sensing device, that monitors speed and/or location of the power detector. The speed and/or location may be stored and correlated with the voltage waveforms indicative of mobile phone usage.

Power detector 205 of FIG. 2 can also be used to detect wireless signals emitted from a transmitter attached to the vehicle rather than held by a driver or passenger. Some vehicles include docking or mounting stations for mobile devices and control the operation of the mobile device upon receiving directions from the driver or passenger.

The power detector 205, as well as additional sensors, and power supply 207, voltage output 209, and other components are preferably located in a single housing, or may be located in multiple housings. The single housing may be preferably affixed to the windshield of a vehicle, or may be located above or below the driver.

Indirect Mobile Device Usage Detection

In some implementations, mobile phone usage may be determined indirectly. A camera sensor similar to a blink rate sensor may be used to look for a driver's hand to either ear. Another embodiment for detecting cell phone use would be to monitor the vehicle's average path deviation per a given time and/or distance interval using a high precision positioning system, i.e., DGPS, WAAS, RTK or other equivalent. The positioning system would be used to compare normal driving without communication use to the driving performance while using a communication device, e.g., monitor weaving and lane departure.

Determining Passenger Numbers

Referring again to FIG. 2, the power detector 205 can be used to measure two or more wireless signals and convert the signals to voltage waveforms. Using the voltage waveforms, the number of nearby cell phones can be determined.

Figure 7:
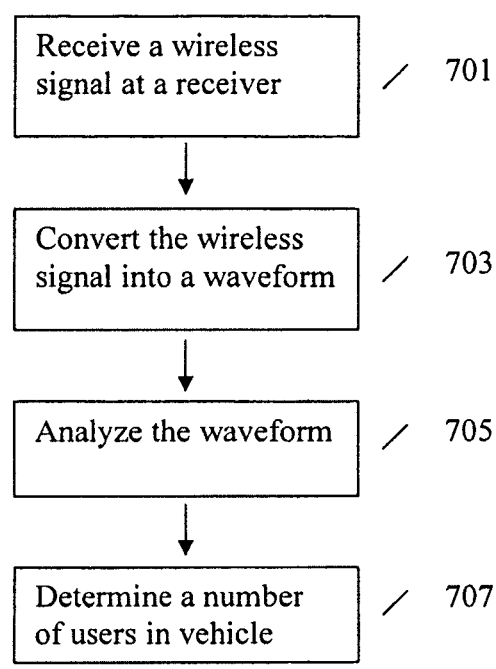
FIG. 7 is a flowchart of a method for detecting wireless signals in a moving vehicle.

Referring now to FIG. 7, there is shown a flowchart describing an overall method of using the system described above with reference to FIGS. 2-6. Initially, an antenna receives wireless signals 701. Then the wireless signals are converted to a voltage waveform 703. Next, the voltage waveform is analyzed to determine the location and number of discrete wireless signals 705. Finally, a number of mobile phone users in a vehicle is determined using the analyzed voltage waveform 707.

Additionally, other sensors can be used to determine number of passengers in a vehicle. Each vehicle includes a sensing bus that communicates with various vehicle sensors, including a seat belt sensor, a weight sensor in a passenger seat used for air bag deployment, and other sensors.

The power detector 205 can also store passenger number data and correlate this information with speed and/or location data received from the motion sensor. In this way, a vehicle with a restricted number of passengers, such as a vehicle driven by a teenage or a vehicle driven by a driver in fleet with passenger restrictions, can be monitored.

Determining Waveforms

Received wireless signals converted into waveforms distinctly show the type of cell phone usage. Measured voltage waveforms are shown below in FIGS. 8-29, illustrating various voltage waveforms in TDMA, GSM, and CDMA wireless systems under various circumstances, including received and transmitted calls, answered and unanswered calls, text messaging, internet browsing, and Bluetooth activity. Voltage waveforms for other frequency wireless signals including satellite band, handheld radios, etc., may also be measured.

In FIGS. 8-29, a Q-wave antenna tuned to 1370 MHz, midway between 800 and 1900 MHz, is connected with an SMA connector to a Linear Tech 748A RF power log-voltage detector powered by a 5V power supply. The power detector has a 0 to 60 dB dynamic range, which corresponds to a minimum measurable signal level of −60 dB converted to 0.2 volts and a maximum measurable level of 0 dB converted to 3 volts.

As shown in FIGS. 8-29, answered and unanswered received calls have different waveforms, while data waveforms for text messages and internet browsing are distinguishable from voice calls. Thus, by comparing received voltage waveforms to known voltage waveforms, exact mobile phone usage can be determined.

Figure 8:
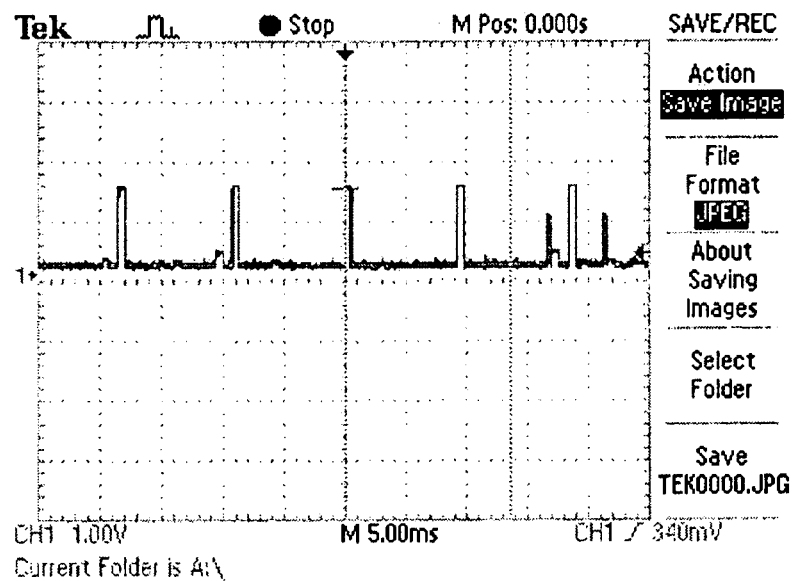
FIG. 8 is a waveform of a TDMA received voice call.
Figure 9:
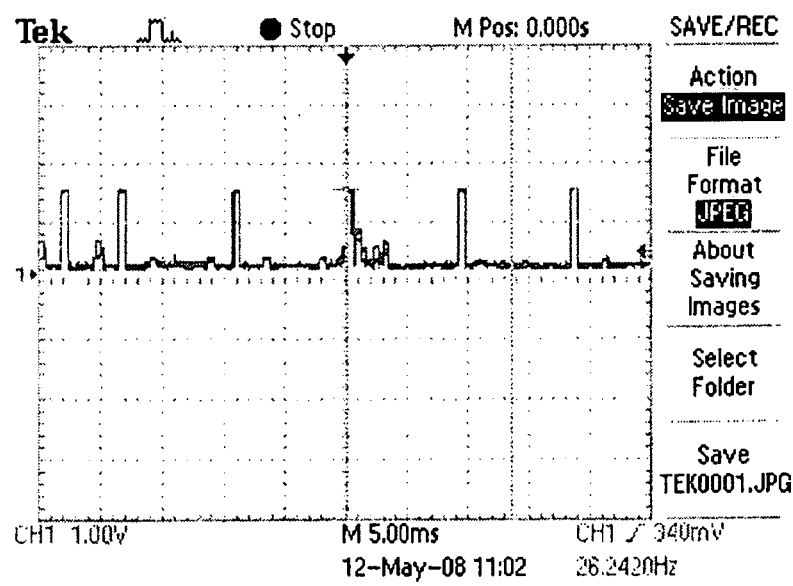
FIG. 9 is a waveform of a TDMA transmit voice call.

Referring now to FIGS. 8 and 9, the waveform for a TDMA voice call is shown. In FIG. 8, a received voice call has a voltage above the threshold, with short voltage peaks and tall voltage peaks. There is approximately 4.5 ms between short peaks and approximately 9 ms between tall peaks. In FIG. 9, a transmitted voice call has a voltage above the threshold, with short voltage peaks and tall voltage peaks. There is approximately 4.5 ms between short peaks and approximately 9 ms between tall peaks.

Figure 10:
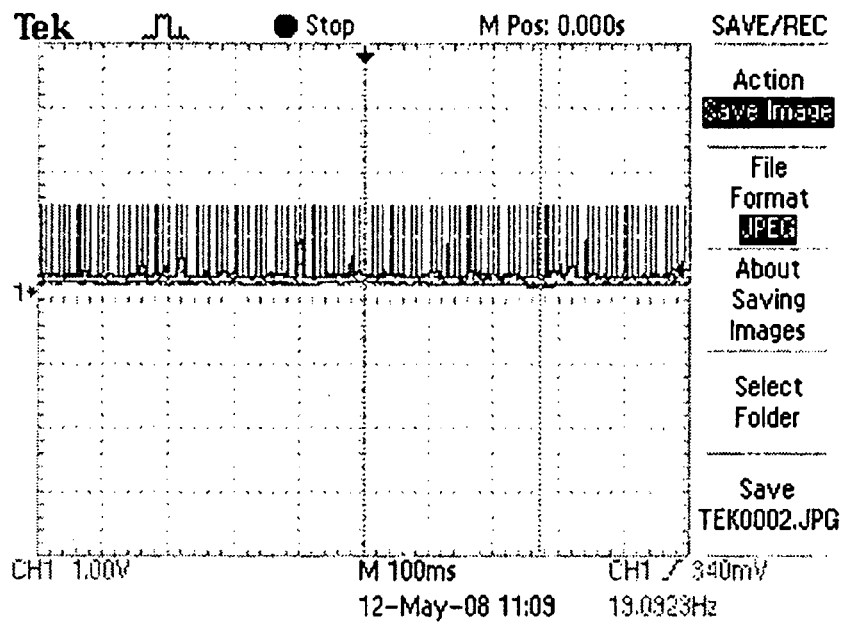
FIG. 10 is a waveform of a TDMA received unanswered voice call.
Figure 11:
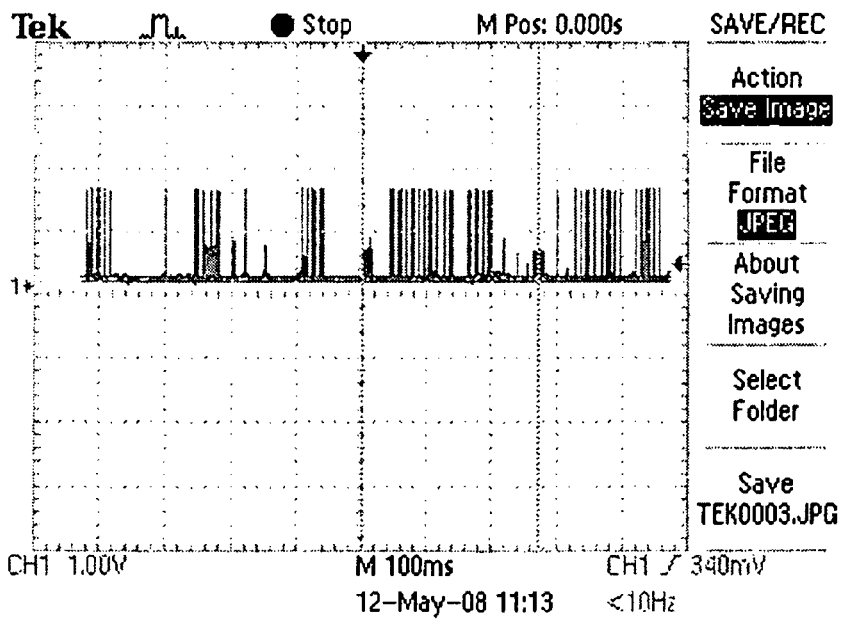
FIG. 11 is a waveform of a TDMA received and answered voice call.

Referring now to FIGS. 10 and 11, the waveform for a TDMA received voice call is shown. In FIG. 10, a received but not answered voice call has a voltage above the threshold, with short voltage peaks and tall voltage peaks. There is a regular non-bursting pattern with approximately 4.5 ms between short peaks and approximately 9 ms between tall peaks. In FIG. 11, a received and answered voice call has a voltage above the threshold, with short voltage peaks and tall voltage peaks. There is a coarse bursting pattern with approximately 4.5 ms between short peaks and approximately 9 ms between tall peaks.

Figure 12:
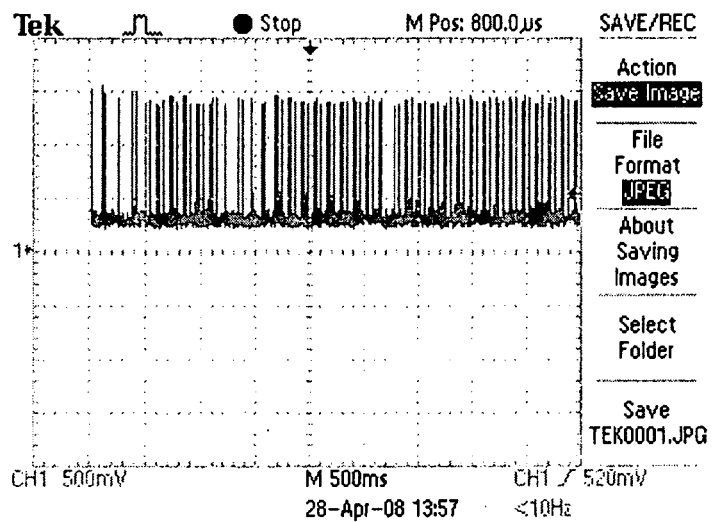
FIG. 12 is a waveform of a TDMA transmit voice call.
Figure 13:
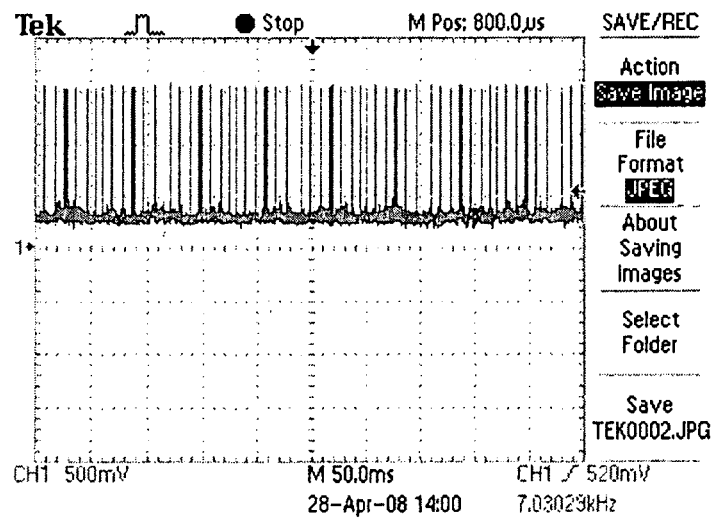
FIG. 13 is a waveform of a TDMA transmit voice call.

Referring now to FIGS. 12 and 13, the waveform for a TDMA transmitted voice call is shown. In FIG. 12, a transmitted voice call has a voltage above the threshold, with short voltage peaks and tall voltage peaks. There is a fine bursting pattern with approximately 4.5 ms between short peaks and approximately 9 ms between tall peaks. In FIG. 13, a transmitted voice call has a voltage above the threshold, with short voltage peaks and tall voltage peaks. There is a fine bursting pattern with approximately 4.5 ms between short peaks and approximately 9 ms between tall peaks.

Figure 14:
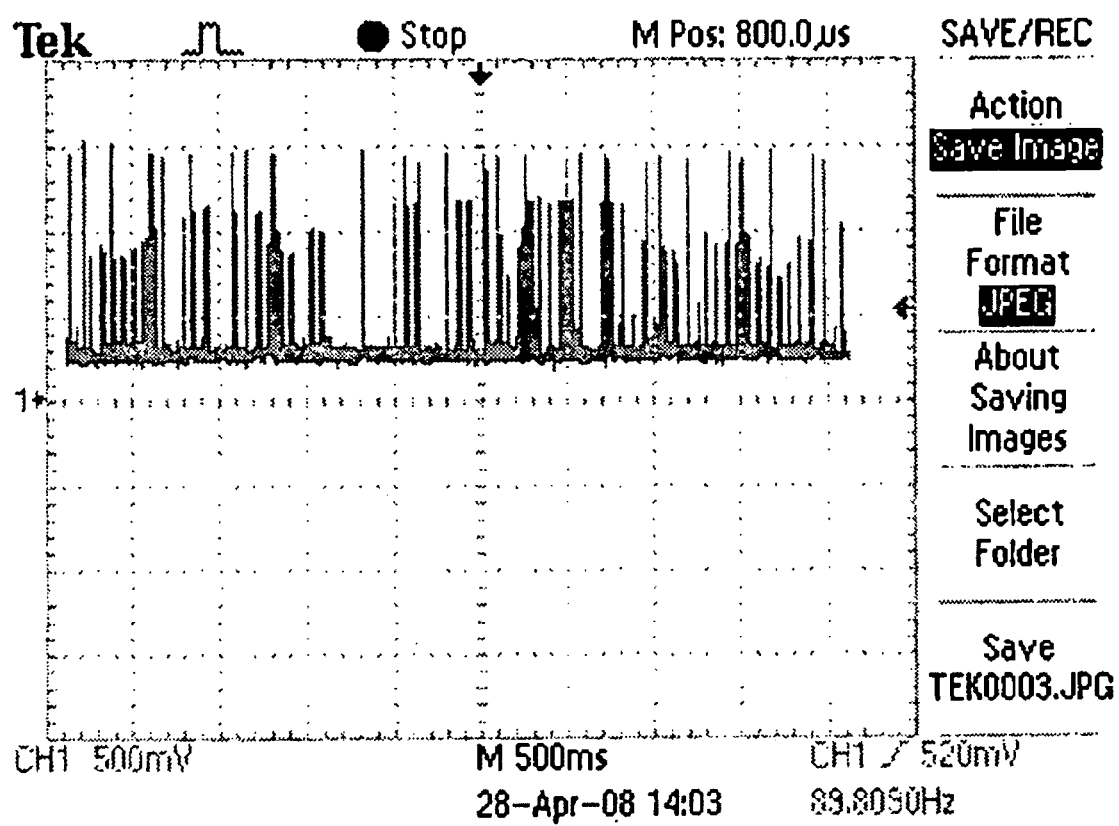
FIG. 14 is a waveform of a TDMA SMS text message.
Figure 15:
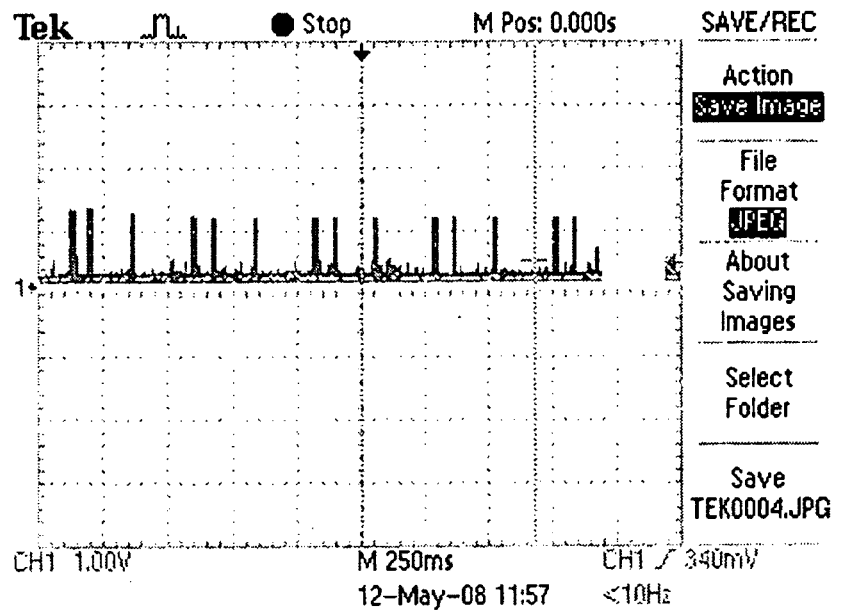
FIG. 15 is a waveform of a TDMA SMS sending text message.
Figure 16:
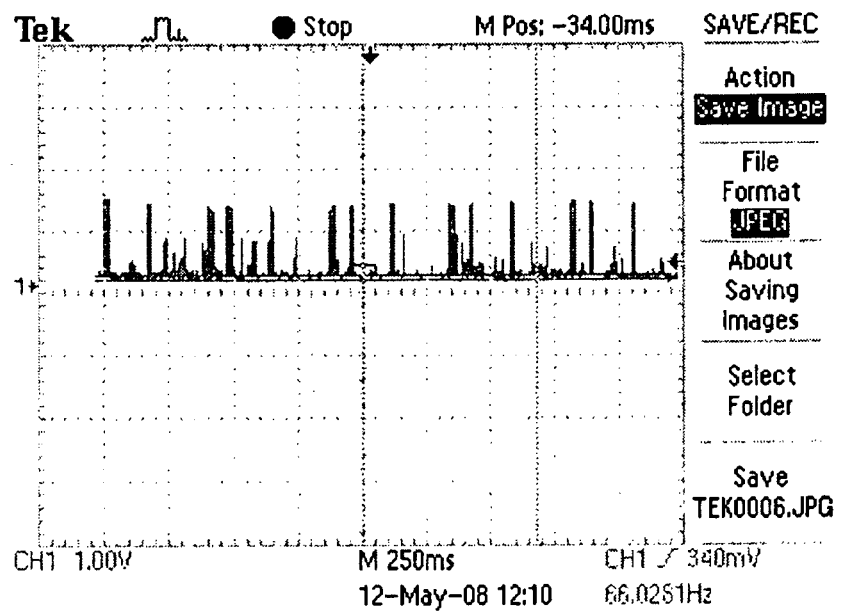
FIG. 16 is a waveform of a TDMA SMS receiving text message.
Figure 17:
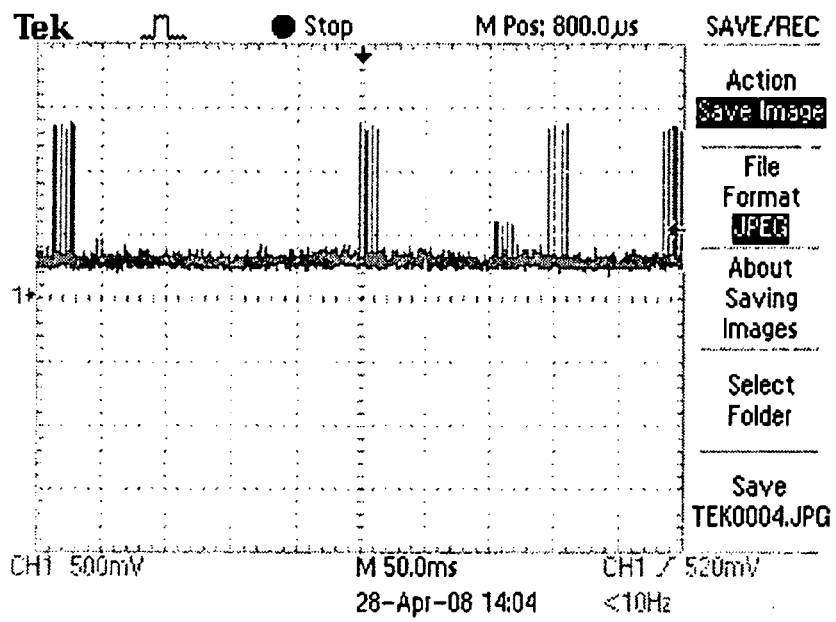
FIG. 17 is a waveform of a TDMA SMS sending text message.
Figure 18:
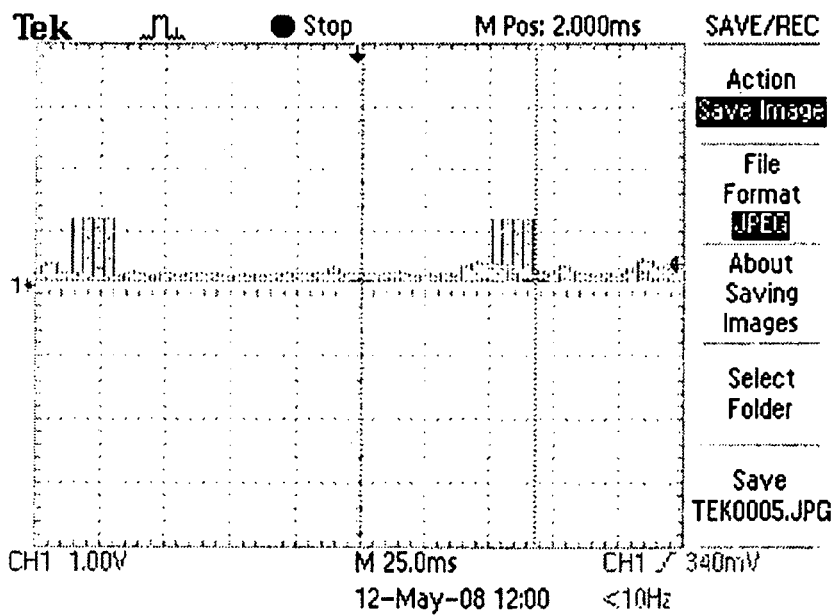
FIG. 18 is a waveform of a TDMA SMS sending text message.

Referring now to FIGS. 14-18, the waveform for a TDMA SMS text message is shown. In FIG. 14, a sent text message has a voltage above the threshold, with short voltage peaks and tall voltage peaks. There is a coarse bursting pattern with approximately 4.5 ms between short peaks and approximately 9 ms between tall peaks. In FIG. 15, a sent text message has a voltage above the threshold, with short voltage peaks and tall voltage peaks. There is a coarse bursting pattern with approximately 4.5 ms between short peaks and approximately 9 ms between tall peaks. In FIG. 16, a received text message has a voltage above the threshold, with short voltage peaks and tall voltage peaks. There is a coarse bursting pattern with approximately 4.5 ms between short peaks and approximately 9 ms between tall peaks. In FIG. 17, a sent text message has a voltage above the threshold, with short voltage peaks and tall voltage peaks. There is a coarse bursting pattern with approximately 4.5 ms between short peaks and approximately 9 ms between tall peaks. In FIG. 18, a sent text message has a voltage above the threshold, with short voltage peaks and tall voltage peaks. There is a coarse bursting pattern with approximately 4.5 ms between short peaks and approximately 9 ms between tall peaks.

Figure 19:
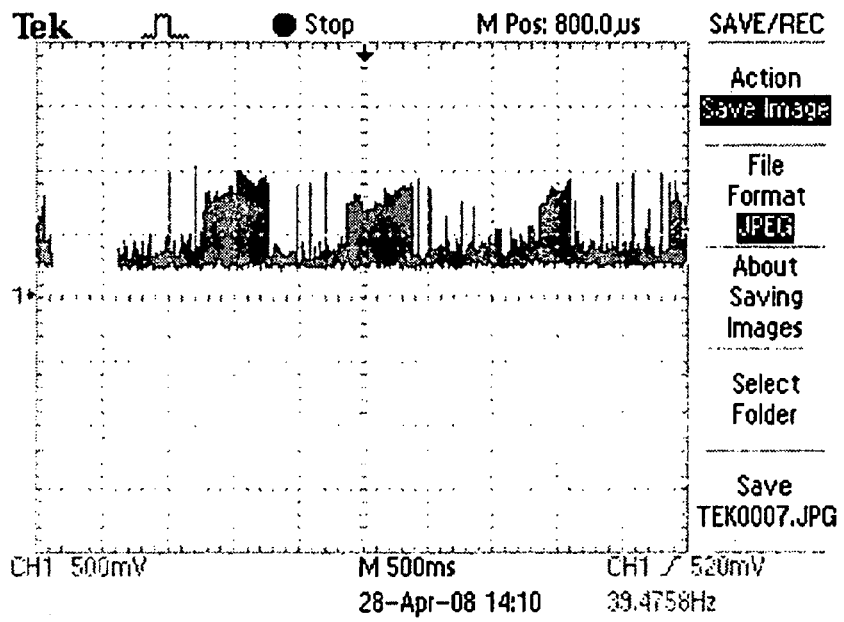
FIG. 19 is a waveform of a CDMA sending data.
Figure 20:
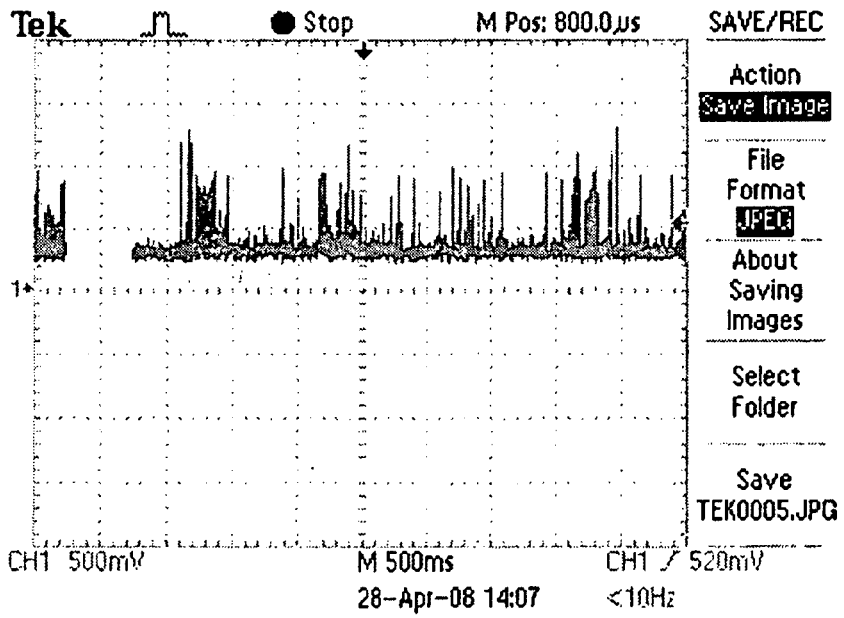
FIG. 20 is a waveform of a CDMA sending data.
Figure 21:
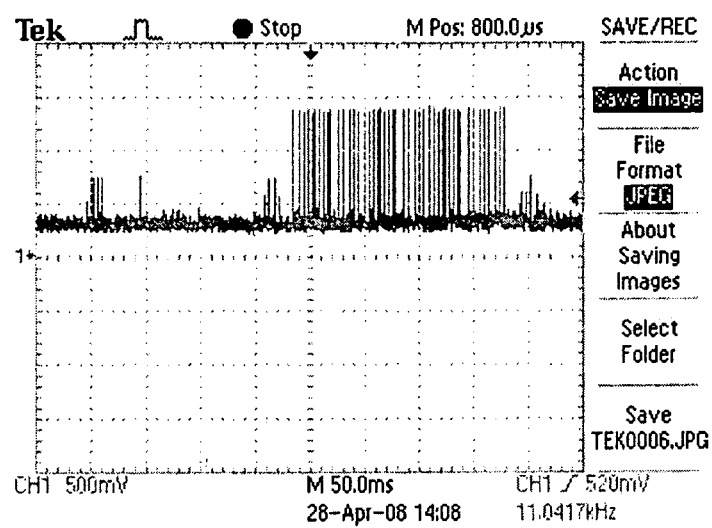
FIG. 21 is a waveform of a CDMA sending data.

Referring now to FIGS. 19-21, the waveform for a CDMA text message is shown. In FIG. 19, a sent text message has a voltage above the threshold, with voltage peaks. There is a coarse bursting pattern with approximately 3 ms between peaks. In FIG. 20, a sent text message has a voltage above the threshold, with voltage peaks. There is a coarse bursting pattern with approximately 3 ms between peaks. In FIG. 21, a sent text message has a voltage above the threshold, with voltage peaks. There is a coarse bursting pattern with approximately 3 ms between peaks.

Figure 22:
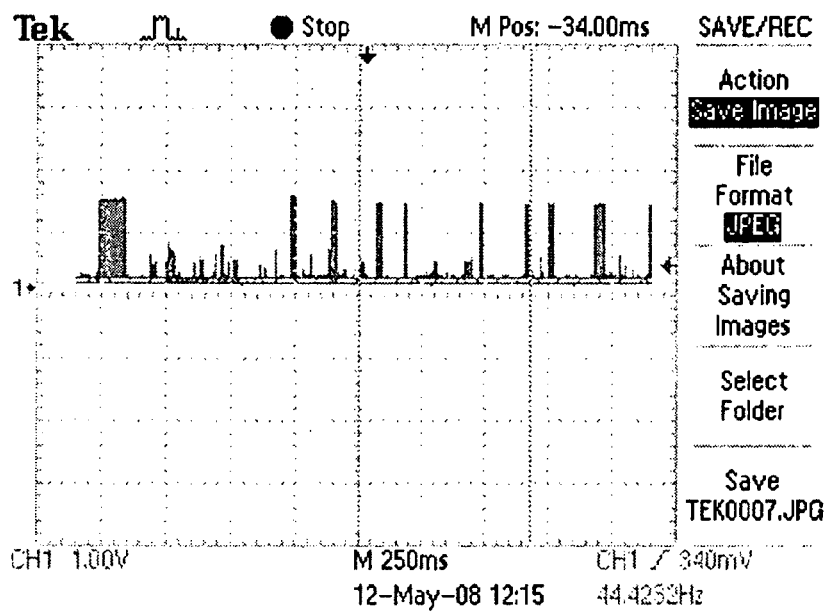
FIG. 22 is a waveform of a TDMA surfing the web.
Figure 23:
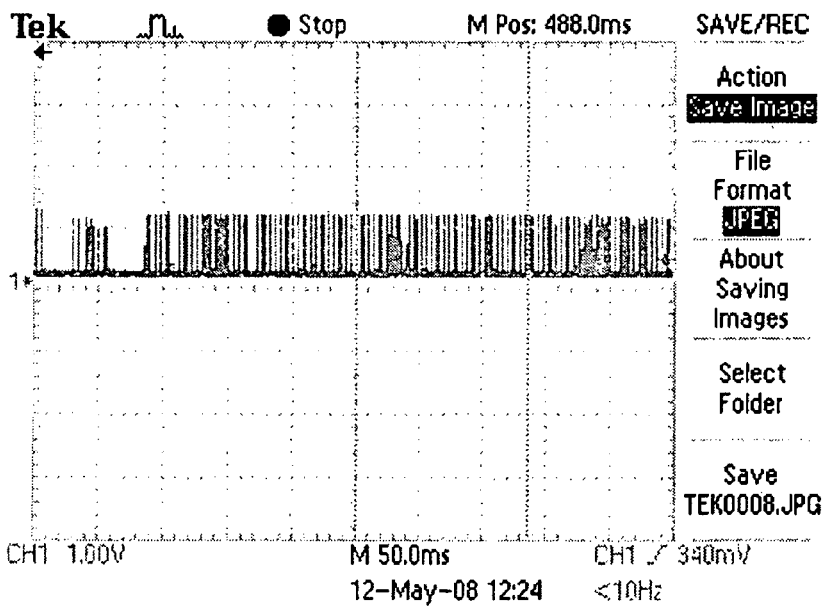
FIG. 23 is a waveform of a TDMA surfing the web.
Figure 24:
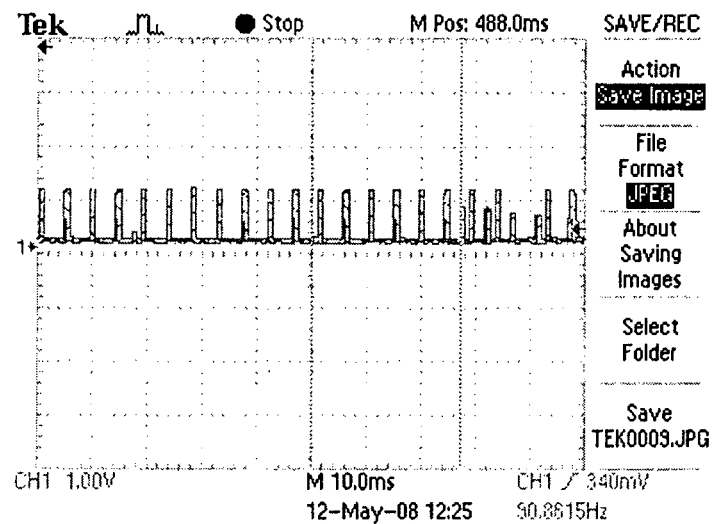
FIG. 24 is a waveform of a TDMA surfing the web.
Figure 25:
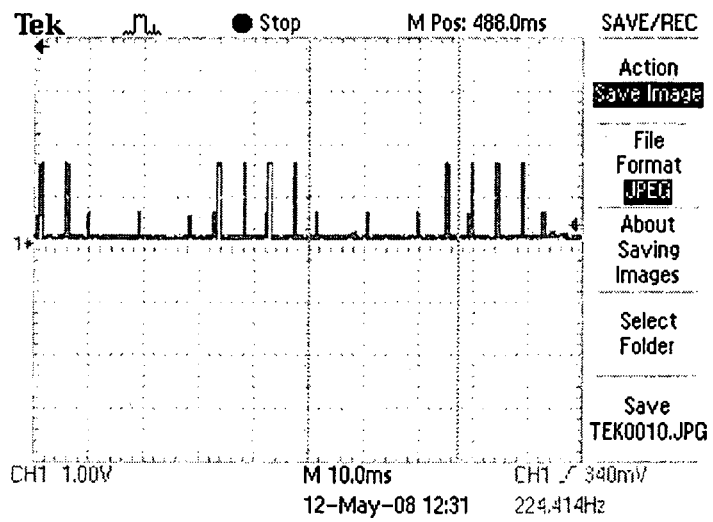
FIG. 25 is a waveform of a TDMA surfing the web.
Figure 26:
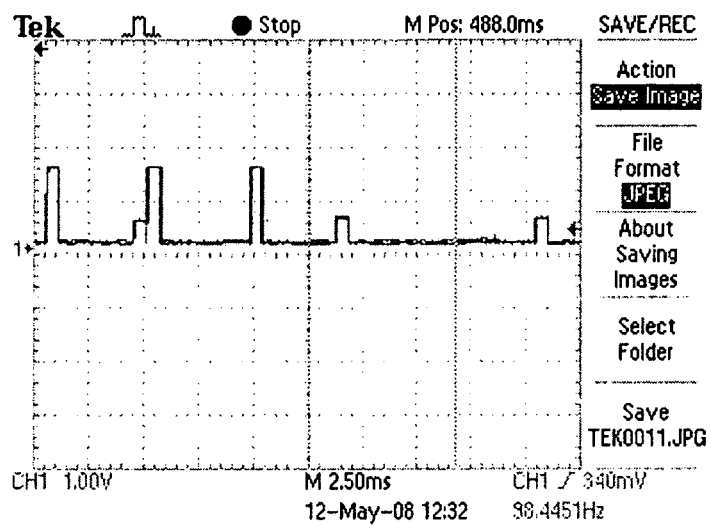
FIG. 26 is a waveform of a TDMA surfing the web.

Referring now to FIGS. 22-26, the waveform for a TDMA data transmission during internet browsing is shown. In FIG. 22, a sent text message has a voltage above the threshold, with short voltage peaks and tall voltage peaks. There is a coarse bursting pattern with approximately 4.5 ms between large peaks. In FIG. 23, a sent text message has a voltage above the threshold, with short voltage peaks and tall voltage peaks. There is a coarse bursting pattern with approximately 4.5 ms between large peaks. In FIG. 24, a sent text message has a voltage above the threshold, with short voltage peaks and tall voltage peaks. There is a coarse bursting pattern with approximately 4.5 ms between large peaks. In FIG. 25, a sent text message has a voltage above the threshold, with short voltage peaks and tall voltage peaks. There is a coarse bursting pattern with approximately 4.5 ms between large peaks. In FIG. 26, a sent text message has a voltage above the threshold, with short voltage peaks and tall voltage peaks. There is a coarse bursting pattern with approximately 4.5 ms between large peaks.

Figure 27:
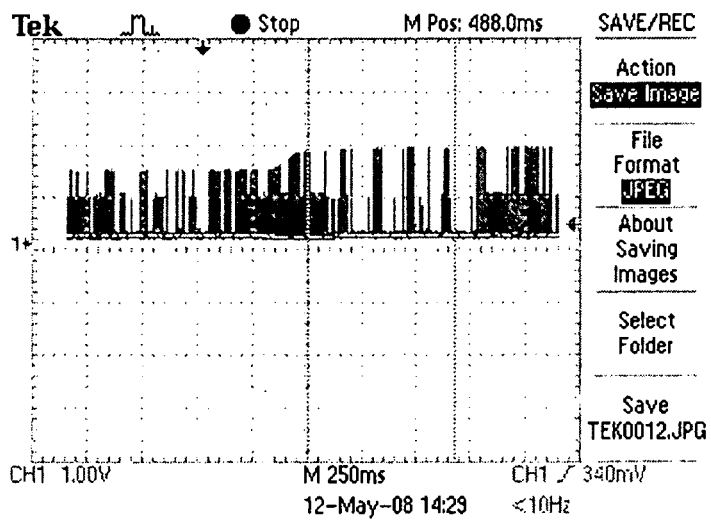
FIG. 27 is a waveform of a TDMA mobile phone at 90° and 0° to sensing antenna.

Referring now to FIG. 27, there is shown a TDMA waveform when a phone is used at 90° and at 0° to the sensing antenna. As shown, there is a 5-10 dB amplitude variation in signal strength, translated to a voltage change, depending upon the orientation of the mobile phone to the sensing antenna.

Figure 28:
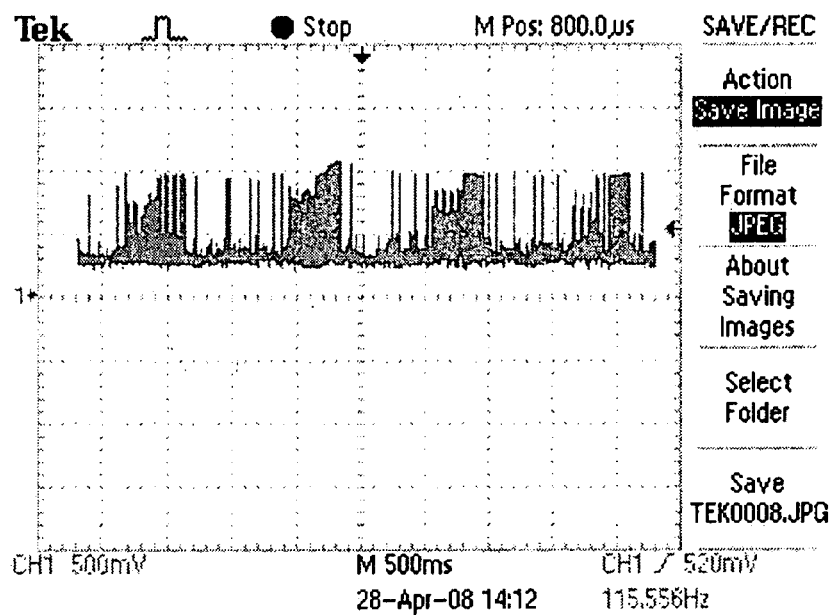
FIG. 28 is a waveform of Bluetooth discovery mode.
Figure 29:
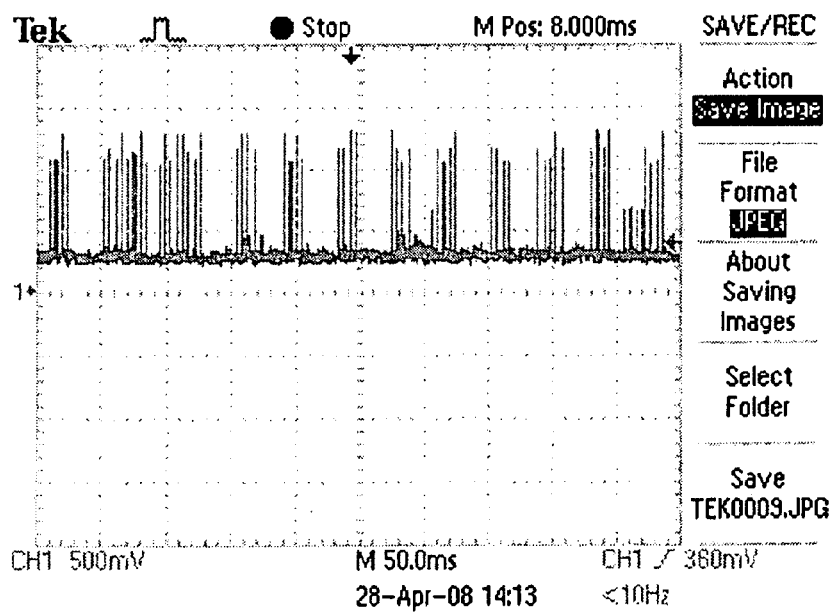
FIG. 29 is a waveform of Bluetooth discovery mode.

Referring now to FIGS. 28 and 29, the waveform for Bluetooth discovery mode is shown. In FIG. 28, the Bluetooth discovery mode has a voltage above the threshold, with short voltage peaks and tall voltage peaks. There is a bursting pattern with 4-5 large peaks every 40 ms with approximately 5 ms between peaks. In FIG. 29, the Bluetooth discovery mode has a voltage above the threshold, with short voltage peaks and tall voltage peaks. There is a bursting pattern with 4-5 large peaks every 40 ms with approximately 5 ms between peaks.

While various embodiments of the present invention have been described above, it should be understood that they have been presented by way of example only and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system installed in a vehicle configured to detect use of a cell phone by one or more persons during operation of the vehicle comprising:
    an antenna for receiving RF signals from one or more cell phones when used by at least one of a driver of the vehicle, and a passenger in the vehicle;
    a power detector coupled to the antenna, the power detector being configured to measure received RF signals from the antenna that are above a defined minimum power threshold, the power detector outputting a voltage waveform that corresponds to the received RF signals above the defined minimum power threshold; and
    signal processing circuitry that receives each voltage waveform output by the power detector and analyzes each output voltage waveform to determine:
        received power which corresponds to the received RF signals for which the voltage waveform is output by the power detector;
        when the received power for a received RF signal is above a first threshold, identifying the received RF signal as a driver signal; and
        when the received power for the received RF signal is above a second threshold, identifying the received RF signal as a passenger signal.

2. The system of claim 1, further comprising:
    a low pass filter coupled to the power detector that receives as an input each voltage waveform output by the power detector, the low pass filter being configured to screen out frequencies other than quad-band frequencies used by the one or more cell phones, and to output a filtered voltage waveform for each measured signal output by the power detector;
    an analog to digital convert (ADC) that receives each filtered signal from the low pass filter and converts the filtered signal to a digital waveform that corresponds to each voltage waveform output by the power detector; and
    a digital processor that receives each digital waveform output from the ADC and analyzes each digital waveform.

3. The system of claim 2, wherein the digital processor that receives each digital waveform output from the ADC analyzes each digital waveform to determine
    (i) a value that represents the received power which corresponds to each RF signal for which a voltage waveform is output by the power detector;
    (ii) when the value for the received power for an RF signal is above a first threshold value, identifying the RF signal for that value as a driver signal; and
    (iii) when the value for the received power for the RF signal is above a second threshold value, identifying the RF signal for that value as a passenger signal.

4. The system of claim 3, further comprising
    system memory which contains data storage of information used to identify certain waveform characteristics that determine one or more types of cell phone use, including at least sending or receiving a voice call, sending or receiving text messages, or sending or receiving web browsing information, or using a hand-free connection to the cell phone, and
    wherein the digital processor that receives each digital waveform output from the ADC comprises a comparator that analyzes each digital waveform using the stored information from system memory used to identify the certain waveform characteristics for types of cell phone use, thus determining for an RF signal for which a voltage waveform is output by the power detector a type of use being made for a cell phone for that RF signal.

5. The system of claim 4, wherein the comparator that analyzes each digital waveform uses a bursting pattern to characterize the nature of the waveform as belonging to a particular type of use.

6. The system of claim 2, further comprising
    system memory which contains data storage of information used to identify certain waveform characteristics that determine one or more types of cell phone use, including at least sending or receiving a voice call, sending or receiving text messages, or sending or receiving web browsing information, or using a hand-free connection to the cell phone, and
    wherein the digital processor that receives each digital waveform output from the ADC comprises a comparator that analyzes each digital waveform using the stored information from system memory used to identify the certain waveform characteristics for types of cell phone use, thus determining for an RF signal for which a voltage waveform is output by the power detector a type of use being made for a cell phone for that RF signal.

7. The system of claim 2, further comprising an additional sensor in communication with the digital processor.

8. The system of claim 7, wherein the additional sensor includes a directional microphone and the digital processor receives directional sound data from the additional sensor and correlates the directional sound data with the detected use of a cell phone.

9. The system of claim 7, wherein the additional sensor includes a seat belt sensor and the digital processor receives seat belt sensor data from the additional sensor and correlates the seat belt sensor data with the detected use of a cell phone.

10. The system of claim 7, wherein the additional sensor includes a weight sensor in a passenger seat and the digital processor receives data from the additional sensor and correlates the data with the detected use of a cell phone.

11. The system of claim 1 further comprising:
a second antenna for receiving RF signals from one or more cell phones when used by one or more of a driver of a vehicle, or a passenger in the vehicle;
a second power detector coupled to the second antenna, the power detector being configured to measure all received RF signals from the antenna that are above a defined minimum power threshold, the power detector outputting a voltage waveform that corresponds to each RF signal above the defined minimum power threshold; and
signal processing circuitry that receives each voltage waveform output by the first and second power detectors and analyzes each output voltage waveform to determine:
the received power which corresponds to each RF signal for which a voltage waveform is output by the first and second power detectors,
the difference between the received power for each RF signal for the first and second power detectors, and
when the difference from the first and second power detectors for the received power for an RF signal is negligible, identifying the RF signal for that value as a driver signal, and
when the difference from the first and second power detectors for the received power for an RF signal is not negligible, identifying the RF signal for that value as a passenger signal.

12. The system of claim 1 wherein the power detector further comprises a motion sensor that monitors at least one of speed or location of the power detector within the vehicle, to provide speed or location correlation with a detected use of a cell phone.

13. The system of claim 11 wherein the power detector further comprises a motion sensor that monitors at least one of speed or location of the power detector within the vehicle, to provide speed or location correlation with a detected use of a cell phone.

14. The system of claim 13, wherein the motion sensor is a GPS sensor.

15. A method of detecting use of a cell phone by one or more persons during operation of a vehicle comprising:
receiving at an antenna RF signals from any of a plurality of cell phones when used by at least one of a driver of the vehicle, and a passenger in the vehicle;
measuring at a power detector received RF signals from the antenna that are above a defined minimum power threshold, the power detector outputting a voltage waveform that corresponds to the received RF signals above the defined minimum power threshold; and
analyzing with signal processing circuitry each voltage waveform output by the power detector to determine:
received power which corresponds to the received RF signals for which the voltage waveform is output by the power detector;
when the received power for a received RF signal is above a first threshold, identifying the received RF signal as a driver signal; and
when the received power for the received RF signal is above a second threshold, identifying the received RF signal as a passenger signal.

16. The method of claim 15, further comprising:
filtering with a low pass filter coupled to the power detector each voltage waveform output by the power detector, the low pass filter screening out frequencies other than quad-band frequencies used by the one or more cell phones, and outputting a filtered voltage waveform for each measured signal output by the power detector;
converting with an analog to digital converter (ADC) each filtered signal from the low pass filter to a digital waveform that corresponds to each voltage waveform output by the power detector; and
analyzing with a digital processor each digital waveform output from the ADC.

17. The method of claim 16, wherein analyzing with the digital processor each digital waveform comprises determining
(i) a value that represents the received power which corresponds to each RF signal for which a voltage waveform is output by the power detector;
(ii) when the value for the received power for an RF signal is above a first threshold value, identifying the RF signal for that value as a driver signal; and
(iii) when the value for the received power for the RF signal is above a second threshold value, identifying the RF signal for that value as a passenger signal.

18. The method of claim 17, further comprising
storing in system memory data representing information used to identify certain waveform characteristics that determine one or more types of cell phone use, including at least sending or receiving a voice call, sending or receiving text messages, or sending or receiving web browsing information, or using a hand-free connection to the cell phone, and
wherein analyzing with the digital processor each digital waveform comprises determining using the stored information from system memory to identify certain waveform characteristics, thus determining for an RF signal for which a voltage waveform is output by the power detector a type of use being made for a cell phone for that RF signal.

19. The method of claim 18 wherein the power detector further comprises a motion sensor that monitors at least one of speed or location of the power detector within the vehicle, and wherein the method further comprises providing speed or location correlation with a detected use of a cell phone.

20. The method of claim 16, further comprising
storing in system memory data representing information used to identify certain waveform characteristics that determine one or more types of cell phone use, including at least sending or receiving a voice call, sending or receiving text messages, or sending or receiving web browsing information, or using a hand-free connection to the cell phone, and
wherein analyzing with the digital processor each digital waveform comprises determining using the stored information from system memory to identify certain waveform characteristics, thus determining for an RF signal for which a voltage waveform is output by the power detector a type of use being made for a cell phone for that RF signal.

21. The method of claim 20, wherein the processor includes a comparator, and wherein the method further comprises analyzing each digital waveform with the comparator by using a bursting pattern to characterize the nature of the waveform as belonging to a particular type of use by comparing it to data stored in system memory that represents identification of certain waveform characteristics depending on the type cell phone use.

22. The method of claim 15 further comprising:
receiving at a second antenna RF signals from one or more cell phones when used by one or more of a driver of a vehicle, or a passenger in the vehicle;

measuring at a second power detector all received RF signals from the second antenna that are above a defined minimum power threshold, and outputting from the second power detector a voltage waveform that corresponds to each RF signal above the defined minimum power threshold; and processing with signal processing circuitry each voltage waveform output by the first and second power detectors and analyzing each output voltage waveform to determine:

the received power which corresponds to each RF signal for which a voltage waveform is output by the first and second power detectors, the difference between the received power for each RF signal for the first and second power detectors, and when the difference from the first and second power detectors for the received power for an RF signal is negligible, identifying the RF signal for that value as a driver signal, and when the difference from the first and second power detectors for the received power for an RF signal is not negligible, identifying the RF signal for that value as a passenger signal.

23. The method of claim 15 wherein the power detector further comprises a motion sensor that monitors at least one of speed or location of the power detector within the vehicle, and wherein the method further comprises providing speed or location correlation with a detected use of a cell phone.

24. The method of claim 15, wherein the power detector further comprises an additional sensor that includes a directional microphone and wherein the digital processor receives directional sound data from the additional sensor, and wherein the method further comprises correlating the directional sound data with the detected use of a cell phone.

25. The method of claim 15, wherein the power detector further comprises an additional sensor that includes a seat belt sensor and wherein the digital processor receives seat belt sensor data from the additional sensor, and wherein the method further comprises correlating the seat belt sensor data with the detected use of a cell phone.

26. The method of claim 15, wherein the power detector further comprises an additional sensor that includes a weight sensor in a passenger seat and the digital processor receives data from the additional sensor, and wherein the method further comprises correlating the data with the detected use of a cell phone.

27. The method of claim 15 wherein detected cell phone use by a driver of the vehicle causes a notification to be sent to the driver.

28. The method of claim 15 wherein detected cell phone use by a driver of the vehicle causes a notification to be sent to a person other than the driver.

29. A hardware storage device containing computer executable instructions which cause one or more processors to implement a method for detecting use of a cell phone by one or more persons during operation of a vehicle, and wherein the implemented method comprises:

analyzing with a digital processor each voltage waveform output by a power detector to determine received power which corresponds to each detected RF signals from one or more cell phones in the vehicle, in order to determine:

(i) a value that represents the received power which corresponds to the each detected RF signals for which a voltage waveform is output by the power detector;

(ii) when the value for the received power for one of the detected RF signals is above a first threshold, identifying the one of the detected RF signals as a driver signal; and (iii) when the value for the received power for the one of the detected RF signals is above a second threshold, identifying the one of the detected RF signals as a passenger signal.

30. The hardware storage device of claim of claim 29, wherein the computer executable instructions causing the one or more processors to implement the method, further include as part of the implemented method:

storing in system memory data representing information used to identify certain waveform characteristics that determine one or more types of cell phone use, including at least sending or receiving a voice call, sending or receiving text messages, or sending or receiving web browsing information, or using a hand-free connection to the cell phone, and wherein analyzing with the digital processor each digital waveform comprises using the stored information from system memory to identify certain waveform characteristics, thus determining for an RF signal for which a voltage waveform is output by the power detector a type of use being made for a cell phone for that RF signal.

* * * * *

UNITED STATES PATENT AND TRADEMARK OFFICE
CERTIFICATE OF CORRECTION

PATENT NO. : 8,688,180 B2
APPLICATION NO. : 12/222260
DATED : April 1, 2014
INVENTOR(S) : Catten Page 1 of 1

It is certified that error appears in the above-identified patent and that said Letters Patent is hereby corrected as shown below:

In the Drawings
Fig. 5, wherein the label of reference number 509 is changed from "Comparator Reference Voltage" to --Comparator Trigger Level Input--

In the Specification
Column 5
Line 25-26, change "a distance d2 from the two antennas 405 and 407" to --a distance d2 from the antenna 405 and a distance d3 from the antenna 407--

Signed and Sealed this
Fifth Day of May, 2015

Michelle K. Lee
*Director of the United States Patent and Trademark Office*